US012574708B2

(12) United States Patent
Subrahmanya et al.

(10) Patent No.: US 12,574,708 B2
(45) Date of Patent: Mar. 10, 2026

(54) COMMUNICATION FOR USER EQUIPMENT GROUPS

(71) Applicant: Apple Inc., Cupertino, CA (US)

(72) Inventors: Parvathanathan Subrahmanya, Sunnyvale, CA (US); Sharad Sambhwani, San Diego, CA (US); Dirk Nickisch, Oberpframmern (DE); Madhukar K Shanbhag, Santa Clara, CA (US); Rohit U Nabar, Sunnyvale, CA (US); Sanjeevi Balasubramanian, San Jose, CA (US); Shiva Krishna Narra, San Jose, CA (US); Sriram Subramanian, Santa Clara, CA (US); Tarik Tabet, San Diego, CA (US); Vishwanth Kamala Govindaraju, Mountain View, CA (US); Yakun Sun, San Jose, CA (US)

(73) Assignee: Apple Inc., Cupertino, CA (US)

( * ) Notice: Subject to any disclaimer, the term of this patent is extended or adjusted under 35 U.S.C. 154(b) by 601 days.

(21) Appl. No.: 17/950,849

(22) Filed: Sep. 22, 2022

(65) Prior Publication Data

US 2023/0142210 A1 May 11, 2023

Related U.S. Application Data

(60) Provisional application No. 63/278,438, filed on Nov. 11, 2021.

(51) Int. Cl.
H04W 4/08 (2009.01)
H04L 5/00 (2006.01)
(Continued)

(52) U.S. Cl.
CPC ............. H04W 4/08 (2013.01); H04L 5/0048 (2013.01); H04L 5/0051 (2013.01); (Continued)

(58) Field of Classification Search
CPC ....... H04W 72/30; H04W 4/08; H04W 48/12; H04W 48/16; H04W 56/001;
(Continued)

(56) References Cited

U.S. PATENT DOCUMENTS 10,805,852 B2 * 10/2020 Xu ......................... H04W 76/20
10,841,847 B2 * 11/2020 Kim ...................... H04W 76/27
(Continued)

FOREIGN PATENT DOCUMENTS

CN        110945936 A      3/2020
CN        113424460 A      9/2021
(Continued)

OTHER PUBLICATIONS

A. Sendonaris, et al., "User Cooperation Diversity—Part I: System Description," IEEE Transactions on Communications, vol. 51, Issue: 11, Nov. 2003.
(Continued)

*Primary Examiner* — Santiago Garcia
(74) *Attorney, Agent, or Firm* — FLETCHER YODER PC

(57) ABSTRACT

User equipment in close proximity may transfer data and control information. For example, the user equipment may exchange data or data sets between each other. Each user equipment can receive and transmit data using radio access technologies. A group of user equipments may include active user equipment and passive user equipment. Active user equipment connects with one or more base stations and transfers data on a wireless communication network via the base station. The active user equipment may communicate with other active user equipment and passive user equipment. Passive user equipment may not connect to any base station and/or the wireless communication network and may
(Continued)

communicate with other passive user equipment and active user equipment (e.g., via a sidelink, peer-to-peer, or device-to-device channel).

20 Claims, 11 Drawing Sheets

(51) Int. Cl.

| | |
|---|---|
| *H04W 48/12* | (2009.01) |
| *H04W 48/16* | (2009.01) |
| *H04W 56/00* | (2009.01) |
| *H04W 68/00* | (2009.01) |
| *H04W 72/30* | (2023.01) |
| *H04W 76/10* | (2018.01) |
| *H04W 76/14* | (2018.01) |
| *H04W 76/15* | (2018.01) |
| *H04W 76/19* | (2018.01) |
| *H04W 76/30* | (2018.01) |
| *H04W 76/40* | (2018.01) |
| *H04W 80/04* | (2009.01) |

(52) U.S. Cl.
CPC ........... *H04W 48/12* (2013.01); *H04W 48/16* (2013.01); *H04W 56/001* (2013.01); *H04W 68/005* (2013.01); *H04W 72/30* (2023.01); *H04W 76/10* (2018.02); *H04W 76/14* (2018.02); *H04W 76/15* (2018.02); *H04W 76/19* (2018.02); *H04W 76/30* (2018.02); *H04W 76/40* (2018.02); *H04W 80/04* (2013.01)

(58) Field of Classification Search
CPC ... H04W 68/005; H04W 76/10; H04W 76/14; H04W 76/15; H04W 76/19; H04W 76/30; H04W 76/40; H04W 80/04; H04W 88/04; H04W 56/00; H04W 56/0015; H04W 56/002; H04W 24/02; H04W 4/12; H04W 8/005; H04W 24/10; H04L 5/0048; H04L 5/0051; H04L 67/567; H04L 67/568; H04L 69/14
See application file for complete search history.

(56) References Cited

U.S. PATENT DOCUMENTS

| | | | | |
|---|---|---|---|---|
| 11,310,004 | B2 * | 4/2022 | Paladugu ................ | H04L 5/001 |
| 12,177,917 | B2 * | 12/2024 | Salkintzis ............. | H04L 47/125 |
| 2006/0221883 | A1 * | 10/2006 | Damnjanovic ....... | H04L 5/0055 |
| | | | | 370/315 |

| | | | | |
|---|---|---|---|---|
| 2007/0189201 | A1 * | 8/2007 | Feder ................ | H04W 28/0247 |
| | | | | 370/328 |
| 2008/0095092 | A1 * | 4/2008 | Kim .................... | H04W 52/287 |
| | | | | 370/311 |
| 2009/0061916 | A1 * | 3/2009 | Kim ..................... | H04W 72/30 |
| | | | | 455/466 |
| 2013/0172035 | A1 * | 7/2013 | Wentink ............... | H04L 5/0055 |
| | | | | 455/517 |
| 2013/0315075 | A1 * | 11/2013 | Tamura ............... | H04L 43/0823 |
| | | | | 370/242 |
| 2016/0029424 | A1 * | 1/2016 | Li ......................... | H04W 8/005 |
| | | | | 370/329 |
| 2016/0366717 | A1 * | 12/2016 | Yang ................. | H04L 25/03866 |
| 2016/0381663 | A1 * | 12/2016 | Zhao .................... | H04W 76/14 |
| | | | | 370/329 |
| 2018/0077612 | A1 * | 3/2018 | Zheng ................... | H04W 76/11 |
| 2018/0176834 | A1 * | 6/2018 | Wei ................... | H04W 36/0066 |
| 2019/0052435 | A1 * | 2/2019 | Martin ................. | H04W 76/27 |
| 2019/0082429 | A1 * | 3/2019 | Xiao ................... | H04W 72/046 |
| 2020/0037285 | A1 * | 1/2020 | Sivavakeesar ........ | H04W 76/19 |
| 2020/0092685 | A1 | 3/2020 | Fehrenbach et al. | |
| 2021/0176775 | A1 * | 6/2021 | Goektepe ......... | H04W 72/1263 |
| 2021/0227436 | A1 * | 7/2021 | Zhang .............. | H04W 36/0079 |
| 2021/0266961 | A1 * | 8/2021 | Yerramalli ........... | H04W 72/21 |
| 2021/0410107 | A1 * | 12/2021 | Park ...................... | H04W 68/02 |
| 2022/0201503 | A1 | 6/2022 | Wang et al. | |
| 2022/0295585 | A1 * | 9/2022 | Salkintzis ......... | H04W 28/0268 |
| 2023/0017794 | A1 * | 1/2023 | Fujishiro .............. | H04W 24/10 |
| 2023/0038861 | A1 * | 2/2023 | Wang ................. | H04W 36/037 |
| 2023/0041767 | A1 * | 2/2023 | Manolakos ........... | H04W 76/28 |
| 2023/0046529 | A1 * | 2/2023 | Baek .................... | H04W 76/40 |
| 2023/0308918 | A1 * | 9/2023 | Jung ..................... | H04W 48/16 |
| 2023/0353297 | A1 * | 11/2023 | Abdelghaffar ....... | H04B 7/0456 |
| 2024/0031891 | A1 * | 1/2024 | Cheng ................ | H04W 36/033 |

FOREIGN PATENT DOCUMENTS

| | | |
|---|---|---|
| WO | 2017105534 A1 | 6/2017 |
| WO | 2018202797 A1 | 11/2018 |

OTHER PUBLICATIONS

R. Rogalin, et al., "Scalable Synchronization and Reciprocity Calibration for Distributed Multiuser MIMO," IEEE Transactions on Wireless Communications, vol. 13, Issue: 4, Apr. 2014.

R. Mudumbai, et al., "Distributed Transmit Beamforming: Challenges and Recent Progress," IEEE Communications Magazine, vol. 47, Issue: 2, Feb. 2009.

H. Vlad Balan, "AirSync: Enabling Distributed Multiuser MIMO with Full Spatial Multiplexing," arXiv:1205.6862, IEEE/ACM Transactions on Networking, Dec. 2013.

D. Richard Brown III, et al., "Time-Slotted Round-Trip Carrier Synchronization for Distributed Beamforming," IEEE Transactions on Signal Processing, vol. 56, Issue: 11, Nov. 2008.

* cited by examiner

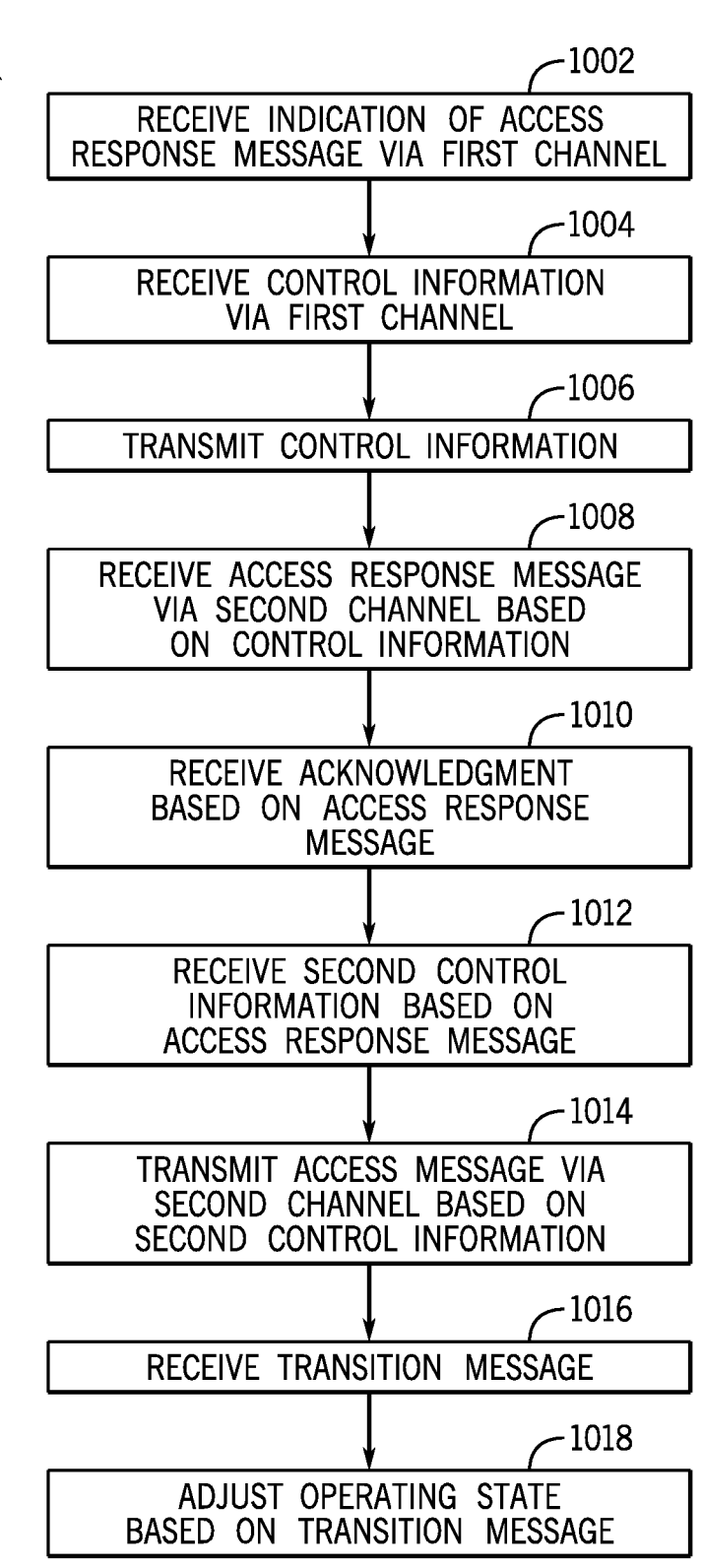

1000

1002
RECEIVE INDICATION OF ACCESS RESPONSE MESSAGE VIA FIRST CHANNEL

1004
RECEIVE CONTROL INFORMATION VIA FIRST CHANNEL

1006
TRANSMIT CONTROL INFORMATION

1008
RECEIVE ACCESS RESPONSE MESSAGE VIA SECOND CHANNEL BASED ON CONTROL INFORMATION

1010
RECEIVE ACKNOWLEDGMENT BASED ON ACCESS RESPONSE MESSAGE

1012
RECEIVE SECOND CONTROL INFORMATION BASED ON ACCESS RESPONSE MESSAGE

1014
TRANSMIT ACCESS MESSAGE VIA SECOND CHANNEL BASED ON SECOND CONTROL INFORMATION

1016
RECEIVE TRANSITION MESSAGE

1018
ADJUST OPERATING STATE BASED ON TRANSITION MESSAGE

FIG. 12

COMMUNICATION FOR USER EQUIPMENT GROUPS

CROSS-REFERENCE TO RELATED APPLICATIONS

This application claims priority to U.S. Provisional Application No. 63/278,438, filed Nov. 11, 2021, entitled "COOPERATIVE COORDINATION SCHEMES FOR MULTI-NODE DEVICES," the disclosure of which is hereby incorporated by reference in its entirety for all purposes.

BACKGROUND

The present disclosure relates generally to wireless communication, and more specifically to cooperative communication for user equipment in a group of user equipment.

User equipment density has increased rapidly over the years. As such, user equipment may support several radio access technologies (RATs) simultaneously in close proximity to one another. Moreover, with the use of high spectrum frequencies (e.g., the millimeter wave (mmW) frequency range, the terahertz (THz) frequency range, and so on), coverage range of wireless communication networks may be limited by signal loss. Additionally, communication between each user equipment and a wireless communication network may be performed through point-to-point connections without cooperation of nearby user equipment.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In yet another embodiment, an electronic device includes a transmitter, a receiver, and a processor coupled to the transmitter and the receiver. The processor transmits an access signal to a set of user equipment within a group of user equipment, transmits a set of transmission attributes associated with the access signal to the set of user equipment, and causes the set of user equipment to transmit the access signal to a base station of a wireless communication network based on the set of transmission attributes.

In another embodiment, a method includes receiving an access signal from a group of user equipment, transmitting an acknowledgement message to the group of user equipment via a first channel, transmitting a response message to the group of user equipment via a second channel, and causing at least one user equipment of the group of user equipment to receive the response message based on the acknowledgement message.

In another embodiment, one or more non-transitory, tangible, computer-readable media store instructions that cause a processor to receive a set of reference signals associated with a group of user equipment, each reference signal associated with a corresponding phase, select a reference signal from the set of reference signals based at least in part on a signal strength associated with the reference signal, transmit information associated with the reference signal to at least one user equipment of the group of user equipment, and cause the at least one user equipment to transmit the information to the group of user equipment.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

FIG. 12 is a flowchart of a method to receive the access response message using active user equipment of the group of user equipment of FIG. 4, according to embodiments of the present disclosure.

DETAILED DESCRIPTION OF SPECIFIC EMBODIMENTS

Figure 1:
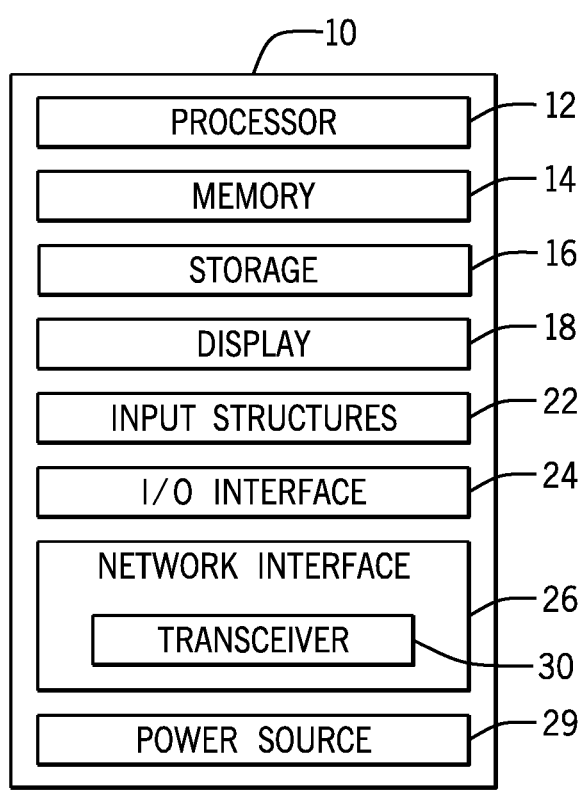
FIG. 1 is a block diagram of user equipment, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on. Additionally, the term "set" may include one or more. That is, a set may include a unitary set of one member, but the set may also include a set of multiple members. Furthermore, as used herein, a set may include a portion (e.g., a subset, all) of data and/or information. While the data is described herein as including two data sets or three data sets, this is intended to be illustrative of certain embodiments. As such, the data may include any suitable number of data sets (e.g., two data sets, three data sets, four data sets, eight data sets, and so forth). Additionally, as used herein, a first set of user equipment may include the same user equipment as another set of user equipment, different user equipment than another set of user equipment, additional user equipment than another set of user equipment, fewer user equipment than another set of user equipment, and so forth.

The present disclosure relates generally to wireless communication, and more specifically to cooperative communication for user equipment in a group of user equipment. Wireless device density has increased rapidly over the years. Wireless communication between user equipment (UE) and wireless communication networks may occur directly through a point-to-point connection without regards to nearby user equipment. Wireless UE may also support several radio access technologies (RATs) simultaneously in close proximity to one another. Moreover, with the use of high spectrum frequencies (the millimeter wave (mmW) frequency range, the terahertz (THz) frequency range, and so on), the range of communication may be limited due to signal dissipation. Employing local communications (e.g., device-to-device communications, sidelink, peer-to-peer)

may facilitate and improve the range, coverage, reliability and efficiency of communications between user equipment and wireless communication networks. This disclosure relates to systems, apparatuses, and techniques to enable user equipment to cooperate with adjacent user equipment to improve coverage and capacity.

User equipment may establish groups to facilitate and coordinate communication with wireless communication networks. Cooperative communication between user equipment may be beneficial for offloading data and controlling transmissions to one or more designated user equipment within a group of user equipment. Data sharing (e.g., via a device-to-device communication link) may also reduce power consumption for user equipment in the group when compared to directly (e.g., without an intervening or intermediate device) communicating with a network. Embodiments herein provide various systems, apparatuses, and techniques to provide cooperative communication for a group of user equipment. In particular, a communication network (e.g., a $5^{th}$ generation (5G)/New Radio (NR) network, a $4^{th}$ generation (4G)/long term evolution (LTE®) network, a $6^{th}$ generation (6G) or greater than 6G network, and so on), via a base station, may communicate with the group of user equipment via one or more active user equipment (e.g., user equipment connected to or directly connected to the communication network). The active user equipment may communicate with passive user equipment (e.g., user equipment disconnected from the communication network). In particular, the user equipment in the group may communicate using a personal area network (PAN), a local area network (LAN) or wireless local area network (WLAN), and/or a wide area network (WAN). User equipment may establish and/or join any number of groups and may be a member of any number of groups simultaneously.

User equipment in close proximity with one another may transfer data and control information. For example, the user equipment may exchange data or data sets between each other. Each user equipment may receive and transmit data using RATs. The user equipment may transmit and receive data from a wireless communication network via any number of base stations or access points. A group of user equipment may include active user equipment and passive user equipment. An active user equipment connects with one or more base stations and transfers data on a wireless communication network via the base station. That is, the active user equipment may be directly connected with one or more base stations. Additionally, the active user equipment may communicate with other active user equipment and passive user equipment. Passive user equipment may not connect to any base station and/or the wireless communication network and may communicate with other passive user equipment and active user equipment (e.g., via a sidelink, peer-to-peer, or device-to-device channel). That is, the passive user equipment may communicate indirectly with the base station and/or the wireless communication network via an active user device.

One or more of the active user equipment may be designated as a primary user equipment. The primary user equipment may control the group membership, define configuration for a device-to-device communication link, and may add or release user equipment from the group. In particular, primary user equipment may control roles for other user equipment in a local network. For example, a first user equipment, such as a portable electronic device, may control and communicate with secondary user equipment, such as a television, a tablet, a computer, and so forth. In some instances, one or more active user equipment and one or more passive user equipment may act as relay user equipment. A relay user equipment may act as an intermediary device and may transfer data from one user equipment to another user equipment in the group. Additionally, the relay user equipment may facilitate communication with the wireless communication network by transferring (e.g., tunneling) data from the base station to other user equipment in the group. In certain embodiments, user equipment may have the same, similar, or different roles and/or responsibilities in different groups of user equipment. For example, one or more user equipment may be designated as active user equipment in a first group and may be designated as passive user equipment in a second group. Additionally or alternatively, one or more user equipment may be designated as primary user equipment and/or active user equipment in a first group and may be designated as passive user equipment and/or relay user equipment in a second group. Furthermore, one or more user equipment may have the same roles and/or responsibilities for multiple groups of user equipment. Moreover, one or more user equipment may have different roles and/or responsibilities within a group of user equipment at different times. For example, one or more user equipment may be designated as a primary user equipment and/or active user equipment at a first time and may be designated as passive user equipment and/or relay user equipment at a second time.

The base stations of the wireless communication network may facilitate communication and provide access for active user equipment to receive and transfer data to and from an application server and/or a communication network. In certain instances, the base stations may be operated and/or controlled by separate carriers or operators. Additionally, the base stations may operate using the same or different communication technologies, such as one or more RATs and/or local networks.

One or more active user equipment may receive data or a data set. The active user equipment may transmit the data or the sets of data to other active user equipment and passive user equipment in the group. That is, the active user equipment may receive the data and/or the data sets and may cooperate and coordinate to facilitate communication of the data from a base station to other user equipment. In certain instances, each active user equipment may connect to one or more base stations. Moreover, the active user equipment may receive the same and/or different data or data sets from different base stations. Additionally, the different base stations may communicate with the active user equipment using the same or different communication technologies. The passive user equipment may receive the data or the data sets from other passive user equipment and/or the active user equipment. As such, a set of the user equipment (e.g., any number of active user equipment, any number of passive user equipment, or any combination thereof) may receive the data sets either directly (e.g., from the base station) and/or indirectly (e.g., from one or more active user equipment, from one or more passive user equipment, or any combination thereof) from the wireless communication network. The user equipment in the group may assemble the data based on the data sets.

In certain instances, the application server may split data into one or more data sets and may transfer the one or more sets to one or more base stations. The active user equipment may receive the sets from the base stations. For example, a first active user equipment may receive a first set from a first base station and a second active user equipment may receive a second set from the second base station. The active user equipment may exchange the data sets between each other and each active user equipment may reassemble the sets to form the data. Additionally or alternatively, the base stations may split data into data sets and/or may split data sets into data subsets.

In some instances, a first set of the active user equipment may utilize a second set of the active user equipment to receive and transfer one or more data sets or portions of the data. In particular, the first set of the active user equipment may cooperate and coordinate to transmit the same data and/or the same data sets. Additionally or alternatively, the first set of the active user equipment may not transmit its received data set to other sets of the user equipment and may assemble multiple data sets received from the other sets of the user equipment. The first set of the active user equipment may receive one or more data sets from the second set of the active user equipment. Accordingly, only the first set of the active user equipment may receive all data sets and may reassemble the data from the data sets. Additionally, the first set of the active user equipment may transmit one or more data sets to one or more passive user equipment. Alternatively, the first set of the active user equipment may transmit the data to one or more passive user equipment. In some instances, a first passive user equipment may transmit one or more data sets or the data to a second passive user equipment. Additionally, the active user equipment may cooperate to transmit the same data set to one or more base stations simultaneously, concurrently, consecutively, overlapping, separately, and so forth. Moreover, a passive user equipment may transmit the same data set to several active user equipment for transmission to the base stations. In certain instances, the passive user equipment may transmit the same data set sequentially or broadcast concurrently to several active user equipment.

In order to transfer data and/or data sets consistently and efficiently, the base stations and/or the active user equipment may split the data into data sets and may transfer the data sets to user equipment within the group. The user equipment may then transfer the data and/or the data sets to other user equipment in the group using local networks and local connections. Once received, the user equipment may assemble the data sets. Data transfer, data splitting, and/or data assembly may be implemented in different layers of various communication protocols.

Additionally, the data may be steered to particular or target active user equipment. For example, the application server may determine a first data set to transmit to a first active user equipment, a second data set to transmit to a second active user equipment, and so forth. Additionally or alternatively, a first base station may determine a third data set to transmit to a second base station based on a connection status between the second base station and the application server.

In certain embodiments, the application server and/or the base stations may generate and/or provide routing information associated with the data. The routing information may include a path (e.g., sequence of user equipment that receive the data, ordering of user equipment that receive the data, and so forth). For example, the base station may generate and/or receive the routing information based on information associated with the group of user equipment. The information may include a list of device-to-device communication links (e.g., current communication links, historical communication links, available communication links, and so forth) between the user equipment. The base station may generate and/or receive a path for transmission of the data to the target user equipment. The base station may first transmit the routing information to one or more active user equipment communicatively coupled to the base station. The routing information may specify one or more active user equipment to receive the data and/or the routing information from the base station. In certain embodiments, the routing information may specify one or more passive user equipment to receive the data and/or the routing information from the one or more active user equipment. Additionally or alternatively, the routing information may specify one or more active user equipment and/or one or more passive user equipment to transmit the data and/or the routing information to the target user equipment. As such, the routing information may specify a path or routing for the data and/or the routing information to take from the application server to the base stations to the user equipment (e.g., active user equipment, passive user equipment, target user equipment).

In some embodiments, the routing information may specify a first set of active user equipment to transmit the data and/or the routing information to from a first base station. Additionally or alternatively, the routing information may specify a second set of active user equipment to transmit the data and/or the routing information to from a second base station. As such, the routing information may include a path or routing for the data and/or the routing information from the application server to one or more active user equipment within the group of user equipment via the base stations. In certain embodiments, the routing information may specify a first set of passive user equipment to transmit the data and/or the routing information to from the first set of active user equipment. Additionally or alternatively, the routing information may specify a second set of passive user equipment to transmit the data and/or the routing information to from the second set of active user equipment. The routing information may also specify active user equipment transmit the data and/or the routing information to other active user equipment. The routing information may also specify passive user equipment transmit the data and/or the routing information to other passive user equipment. The routing information may also specify the target user equipment to receive the data and/or the routing information. While the above describes paths or routing for data from an application server to target user equipment, routing information may also be used to specify a path or routing for data from any user equipment to the application server via active user equipment, passive user equipment, base stations, and so forth. Additionally or alternatively, the routing information may be transmitted (e.g., by the base stations, by the user equipment) concurrently with the data, subsequently to transmission of the data, prior to transmission of the data, or any other suitable timing.

Active user equipment may be controlled or configured using control channels based on the direct connection to the base station. Passive user equipment may have an indirect connection to the base station and may be accessible via an updated control channel path. Control channels provide configuration data to user equipment for paging the user equipment and scheduling data reception and transmission. Active user equipment may identify that a paging message, a configuration message, and/or control data is intended for passive user equipment. The active user equipment may perform the identification based on an identifier associated with a protocol layer format.

A Radio Resource Control (RRC) message may provide configuration data to user equipment. The base station may transmit the RRC message to an active user equipment that in turn transmits the message to a passive user equipment. Responses may be transmitted to the base station via the active user equipment (e.g., in some cases, from passive user equipment). Downlink Control Information (DCI) and Uplink Control Information (UCI) may be utilized to control physical layer operation.

Moreover, the user equipment may utilize various criteria for entering and/or leaving a group of user equipment. The criteria may include a network signal quality of the user equipment, a power connection, a battery level of the user equipment, a time window, a geographic area of the user equipment, user equipment capabilities (e.g., communication capabilities, computing and/or processing capabilities, sensing capabilities, and so forth), a device-to-device connection, a trust level between user equipment, and so forth. The network signal quality of the user equipment may be compared to a threshold. When below the threshold, there may be a risk that service is interrupted. If another user equipment or a group of user equipment are in close proximity, the user equipment may attempt to form a group or enter the previously formed group. If a user equipment is connected to an electrical grid (e.g., such that it is not powered via its battery), it may no longer require the benefits of shared resources within a group and may leave the group. Alternatively, when connected to electrical grid, the user equipment may receive additional tasks within the group. Additionally, the criteria may be selected based on user preferences and/or user equipment history.

Formation of the group of user equipment may begin with user equipment discovery. The user equipment may receive an input to begin user equipment discovery. Additionally or alternatively, the user equipment may begin discovery based on satisfaction of any number of discovery criteria. For example, the discovery criteria may include a power connection, a battery level of the user equipment, a signal strength (e.g., Received Signal Strength Indicator, signal to noise ratio (SNR), or other signal characteristics) associated with the wireless communication network, a time window, a geographic area of the user equipment, and so forth. User equipment may discover other nearby user equipment using wired communications, such as power-line communication (PLC), such as a broadband over power lines (BPL) communication, and/or wireless communications, such as personal area network (PAN), such as an ultra-wideband (UWB) or a BLUETOOTH® network, a local area network (LAN) or wireless local area network (WLAN), and/or a wide area network (WAN). User equipment may be permitted to search for and join a group of user equipment during a particular time window. Additionally, the user equipment may search for and enter a group of user equipment when within a particular geographic area or in proximity or range of a set of user equipment, such as a home or an office. Alternatively, the user equipment may leave a group when leaving the particular geographic area or the proximity or range of the set of user equipment. User equipment that lacks radio technology or does not support particular frequencies may search for and enter a group of user equipment with different and/or greater user equipment capabilities. Additionally, the user equipment may determine whether the user equipment capabilities permit the user equipment to communicate with other user equipment in the group. The user equipment may determine whether a stable device-to-device connection is available with one or more user equipment in the group based on the Received Signal Strength Indicator (RSSI) and signal to noise ratio (SNR), or other signal characteristics. User equipment trust may be established based on previously entering the group of user equipment.

User equipment may save power by causing a cellular modem or transceiver to enter a power saving state, such that the cellular modem does not send or receive signals. When it is time to send or receive signals, the user equipment may activate or wake the cellular modem up to enter an operational state. However, there may be complications in waking up the modem to receive signals when the modem is in the power saving state.

User equipment may continuously or periodically activate a receiver (e.g., a receiver of a cellular modem) to ensure that wireless (e.g., cellular) signals are received. However, this continuous or periodic activation of the receiver may consume excessive power. Instead, the user equipment may include a wake-up or low power receiver that may consume less power than the cellular receiver as it is lower in complexity (e.g., may not demodulate a received signal, may not amplify a received signal, may not filter a received signal, or so on). If the user equipment is not actively receiving a wireless signal, or not receiving a wireless signal for a threshold period of time, the user equipment may cause the receiver to enter a sleep or power-saving mode, or be deactivated (e.g., powered off), and activate the wake-up signal receiver. The wake-up signal receiver may then periodically scan for a wireless wake-up signal sent from a wireless (e.g., cellular) network.

Upon receiving the wake-up signal, the wake-up signal receiver may activate or wake up the cellular receiver, which may begin receiving wireless signals (e.g., cellular signals having user data). The wake-up signal receiver may then enter a sleep or power-saving mode, or be deactivated. However, embedding the wake-up signal in a cellular signal (e.g., having a frequency between 700 megahertz (MHz) and 71 gigahertz (GHz)) may include several drawbacks, such as causing interference with the cellular signal and/or other cellular signals and/or reducing overall spectrum efficiency of a cell or base stations. That is, an increase in traffic of the cell may negatively impact coordination between the wake-up signal receiver and the cell.

The wake-up signals may have low frequencies (e.g., 1 gigahertz or less, 800 megahertz (MHz) or less, within a range of 500 MHz to 680 MHz, and so on), such as by using a television whitespace spectrum. In some embodiments, the cellular network may determine that the user equipment should enter the sleep mode (e.g., due to inactivity of the cellular receiver), and the network (e.g., via a Next Generation NodeB (gNodeB or gNB) base station) may request resources for the user equipment and activate the wake-up signal receiver of the user equipment. In additional or alternative embodiments, when the cellular receiver of the user equipment enters an idle state (e.g., an RRC Idle or Inactive state), the cellular network (e.g., via the gNodeB base station) may request resources for the user equipment and activate the wake-up signal receiver of the user equipment.

In the event that the network has data to send to the user equipment, a threshold time has expired, and so on, the network may request a wake-up signal, which broadcasts the wake-up signal that may be received by the user equipment. Similarly, if the user equipment has data (e.g., user data) to transmit to the network, the user equipment may acquire a cell supported by a base station of the network. In this manner, the user equipment may cause its cellular receiver to enter a power-saving mode and activate its wake-up signal receiver when it is not actively receiving data, ensuring that the wake-up signal receiver activates its cellular receiver when there is data to send or receive, while saving power.

Entering a group of user equipment may begin with group discovery. One or more user equipment within the group may transmit reference signals on a local communications frequency. The reference signals may include the specialized wake-up signals that reduce power consumption. The user equipment may transmit and/or receive the wake-up signals via a device-to-device connection. Additionally or alternatively, the reference signals may include a first reference signal that includes a specialized wake-up signal and a second reference signal that includes additional information. The user equipment may transmit the second reference signal based on an acknowledgement from another user equipment of the first reference signal. The user equipment may select one or more reference signals based on various transmission criteria. For example, the transmission criteria may include a power connection, a battery level of the user equipment, a time window, a geographic area of the user equipment, user equipment capabilities (e.g., communication capabilities, computing and/or processing capabilities, sensing capabilities, and so forth), and so forth.

User equipment outside the group may periodically search for and attempt to detect the reference signals. Additionally or alternatively, any number of user equipment may receive a synchronization signal from one or more base stations via the wireless communication network. The user equipment may receive the synchronization signal and may scan for reference signals and/or transmit reference signals. The user equipment may measure the reference signals and join the group. The next step of entering the group includes establishing device-to-device connections. The device-to-device connection may be direct or through a local network connection. The user equipment may also exchange user equipment capabilities. The user equipment capabilities may be utilized to determine preferred communication frequencies, the types of communication technologies of the group and the new user equipment, a current battery status of the user equipment, a current thermal status of the user equipment, and so forth. Each user equipment may periodically send a keep alive message to at least one primary user equipment and/or active user equipment in the group. Additionally, the user equipment may send an exit message to at least one primary user equipment and/or active user equipment in the group. For example, the user equipment may send the exit message based on failing to satisfy any number of group criteria, such as a signal strength associated with a device-to-device connection to at least one primary user equipment and/or active user equipment.

To maintain the group, the number of active user equipment and/or the number of passive user equipment may be controlled (e.g., by the primary user equipment). For example, if an active user equipment leaves coverage of a base station, the active user equipment may be reassigned as a passive user equipment. A primary user equipment may fall below a battery threshold and a new primary user equipment may be assigned. The primary user equipment may receive regular updates from other user equipment in the group regarding battery status, thermal status, and link status of the user equipment. Additionally, the primary user equipment may maintain a list of candidates from the active user equipment to be assigned as a new primary user equipment. The primary user equipment may send a request to one of the candidates to become a new primary user equipment. Additionally, the primary user equipment may determine elapsed times from receiving keep alive messages and/or from receiving data from any of the user equipment within the group. The primary user equipment may compare the elapsed times to a threshold time duration and may transmit an exit message based on one or more of the elapsed times exceeding the threshold time duration. The primary user equipment may remove a device identifier associated with the user equipment based on the elapsed time. Additionally, the user equipment may determine elapsed times from receiving keep alive messages and/or from receiving data from at least one primary user equipment and/or active user equipment. The user equipment may compare the elapsed times to a second threshold time duration and may transmit an exit message based on one or more of the elapsed times.

The group of user equipment may cooperate to communicate with the wireless communication network. The user equipment may receive synchronization signals to facilitate communication with the wireless communication network. The user equipment may be synchronized in one or more of time, frequency, and/or phase. The synchronization signal may include timing information that assists the user equipment in transmission and/or reception of data via the wireless communication network. The synchronization signal may also include frequency information that reduces phase drift. The synchronization signal may also include phase information that provides coherent (e.g., in-phase) signal transmission to the wireless communication network. Additionally, the primary user equipment may transmit a selected time, a selected frequency, and/or a selected phase to other user equipment in the group. The primary user equipment may also select one or more of a carrier frequency, a bandwidth, a sub-carrier spacing, and so forth associated with the wireless communication network.

One or more base stations may transmit the synchronization signals to any number of user equipment. The user equipment may also receive synchronization signals from a source external from the wireless communication network, such as a global navigation satellite system (GNSS) signal. Alternatively, any user equipment may transmit synchronization signals to other user equipment within the group. The user equipment may receive the synchronization signals and may determine timing synchronization and/or frequency synchronization based on the synchronization signals. The primary user equipment may select a bandwidth associated with the synchronization signals. Additionally, the primary user equipment may select a transmission duration associated with the synchronization signals based on the frequency. The primary user equipment may also select a periodicity associated with the synchronization signals.

Each user equipment may transmit sounding reference signals to one or more base stations via the wireless communication network. The base stations may receive the sounding reference signals and may determine phase relationships (e.g., phase differences) between the user equipment. Additionally, the base stations may determine and/or may select a set of phases that provides optimized signal strength for communications between the group of user equipment and the wireless communication network. The base stations may transmit the set of phases to any number of user equipment, such as the primary user equipment. The primary user equipment may transmit the set of phases to other user equipment within the group.

Establishing communication with the wireless communication network may begin with receiving system synchronization signals, such as a primary synchronization signal (PSS), a secondary synchronization signal (SSS), and so forth. The user equipment may receive the synchronization signals and may determine radio frame boundaries based on the synchronization signals. The user equipment may also receive system information transmitted via one or more base stations of the wireless communication network. The primary user equipment may transmit user equipment capabilities associated with the primary user equipment to one or more active user equipment. The user equipment capabilities may include communication capabilities, computing and/or processing capabilities, sensing capabilities, radio frequency bands, carrier frequencies, cell identifiers, radio access technologies, and so forth associated with the primary user equipment. The active user equipment may receive the synchronization signals and/or the system information from the wireless communication network based on the user equipment capabilities associated with the primary user equipment. The active user equipment may receive a portion of the synchronization signals and/or a portion of the system information. The primary user equipment may receive these portions from the active user equipment and may assemble these portions to form the synchronization signals and/or the system information.

The primary equipment may select a set of communication parameters, such as a frequency, a time, a cell identifier, and so forth, for communication with the wireless communication network based on the synchronization signals and/or the system information. The primary equipment may transmit the set of communication parameters to the active user equipment within the group. The primary user equipment may transmit a random access signal to the active user equipment within the group. The primary user equipment may also instruct the active user equipment to transmit the random access signal based on the set of communication parameters. The primary user equipment may also transmit the random access signal based on the set of communication parameters. One or more base stations may receive the random access signal and may transmit an acknowledgement message to the primary user equipment and/or the active user equipment. The primary user equipment may retransmit the random access signal if the acknowledgement message is not received within a threshold time duration. The primary user equipment may also instruct the active user equipment to retransmit the random access signal. The group of user equipment may retransmit the random access signal with various relative phases. The group of user equipment may periodically retransmit the random access signal until the acknowledgement message is received. Alternatively, the group of user equipment may retransmit the random access signal until a threshold number of transmissions is reached. Additionally, each user equipment may adjust a transmission power associated with the random access signal for subsequent transmissions. The random access signal may include an orthogonal signal.

The base stations may transmit the acknowledgement message to the group of user equipment. The acknowledgement message may include communication information associated with the wireless communication network. The base station may transmit an indication of the acknowledgement message on a downlink control channel. The base station may also transmit information associated with downlink shared channel. The user equipment may monitor the downlink control channel and may receive control channel information from the base stations via the downlink control channel. The active user equipment may transmit control channel signals to the primary user equipment that aggregates and/or assembles the control channel signals for processing and decoding control channel information. The active user equipment may receive and/or decode the control channel information and may transmit the control channel information to the primary user equipment. The control channel information may include downlink control information that identifies information associated with a transmission (e.g., the acknowledgement message) on the downlink shared channel. The user equipment may utilize the information to receive the acknowledgement message via the downlink shared channel. Additionally, the user equipment may receive access message information associated with transmission of an access message to the base stations.

The primary user equipment may receive the access message information and may determine communication parameters (e.g., time, frequency, temporary identifier, timing adjustment, and so forth) associated with transmission of the access message. The primary user equipment may transmit the communication parameters to the active user equipment. The primary user equipment may instruct the active user equipment to transmit the access message based on the communication parameters. The user equipment may transmit the access message via an uplink shared channel. The user equipment may transmit the access message using a space time block code (STBC) or orthogonal signal. Each user equipment may transmit a row of a STBC via an antenna. Additionally or alternatively, the primary user equipment may transmit a set of phases to the active user equipment. Each phase may be associated with a corresponding active user equipment. The active user equipment may transmit the access message based on the set of phases.

The base stations may receive the access message from one or more active user equipment. The base station may transmit a transition message in response to the access message. The transition message may cause the user equipment to adjust an operational mode to a connected mode. In the connected mode, the user equipment may communicate with the base stations via the downlink control channel, downlink shared channel, uplink control channel, and uplink shared channel. The user equipment may utilize multiple-input and multiple-output (MIMO) techniques for data communication with the wireless communication network. On the downlink channels, the active user equipment within the group may receive MIMO orthogonal frequency-division multiplexing (MIMO-OFDM) signals and/or time domain samples and may transmit the same to the primary user equipment. The primary user equipment may demodulate the MIMO-OFDM signals. On the uplink channels, active user equipment within the group identify multiple sounding reference signal phase combinations for transmission of MIMO signals.

The user equipment may receive reconfiguration messages that reconfigure the user equipment to allow local communication between the user equipment. The reconfiguration messages may include an additional delay for a user equipment within the group of user equipment to allow for local communication. That is, user equipment that join the group may be reconfigured to include the additional delay.

FIG. 1 is a block diagram of user equipment 10 (e.g., a mobile electronic device), according to embodiments of the present disclosure. The user equipment 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in the user equipment 10.

By way of example, the user equipment 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the user equipment 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the user equipment 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the user equipment 10 to provide various functionalities.

In certain embodiments, the display 18 may facilitate users to view images generated on the user equipment 10. In some embodiments, the display 18 may include a touch screen, which may facilitate user interaction with a user interface of the user equipment 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the user equipment 10 may enable a user to interact with the user equipment 10 (e.g., pressing a button to increase or decrease a volume level). The I/O interface 24 may enable user equipment 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a $6^{th}$ generation (6G) or greater than 6G cellular network, a satellite network, a non-terrestrial network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)) and/or any other cellular communication standard release (e.g., Release-16, Release-17, any future releases) that define and/or enable frequency ranges used for wireless communication. The network interface 26 of the user equipment 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

Figure 2:
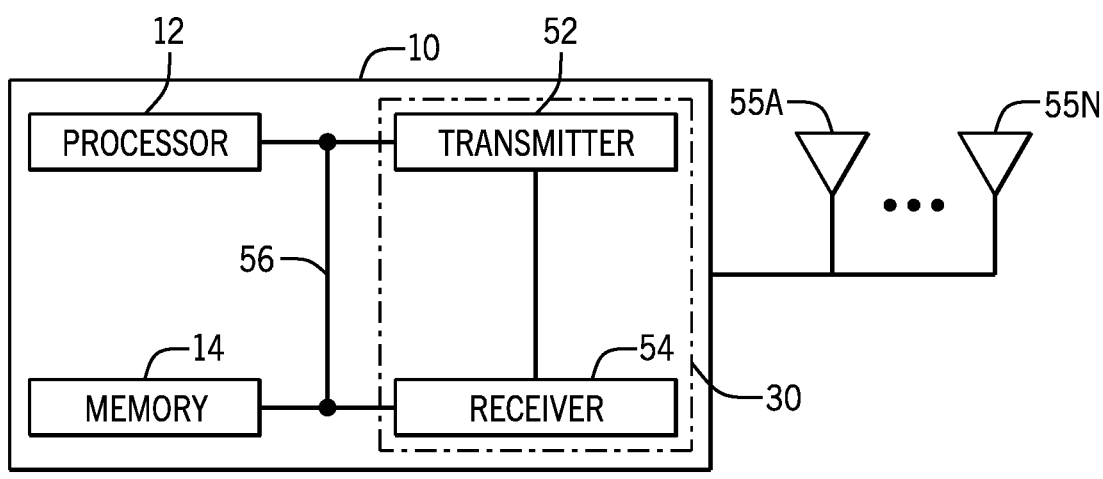
FIG. 2 is a functional diagram of the user equipment of FIG. 1, according to embodiments of the present disclosure.

FIG. 2 is a functional diagram of the user equipment 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The user equipment 10 may include the transmitter 52 and/or the receiver 54 that respectively enable transmission and reception of data between the user equipment 10 and an external device via, for example, a network (e.g., including base stations or access points) or a direct connection. As illustrated, the transmitter 52 and the receiver 54 may be combined into the transceiver 30. The user equipment 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam. The user equipment 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

The user equipment 10 may include the wake-up or low power receiver that, in operation, consumes less power than the receiver 54 as it is lower in complexity (e.g., may not demodulate a received signal, may not amplify a received signal, may not filter a received signal, or so on). That is, the wake-up WUS receiver may include fewer or less complex components than the receiver 54, such that, in operation, it uses less power than the receiver 54. For example, the wake-up signal receiver may not include a demodulator, an amplifier, a filter, or the like, where the receiver 54 does include such a component. Moreover, the various components of the user equipment 10 may be coupled together by a bus system 58. The bus system 58 may include a data bus, for example, as well as a power bus, a control signal bus, and a status signal bus, in addition to the data bus. The components of the user equipment 10 may be coupled together or accept or provide inputs to each other using some other mechanism.

Moreover, the various components of the user equipment 10 may be coupled together by a bus system 56. The bus system 56 may include a data bus, for example, as well as a power bus, a control signal bus, and a status signal bus, in addition to the data bus. The components of the user equipment 10 may be coupled together or accept or provide inputs to each other using some other mechanism.

Figure 3:
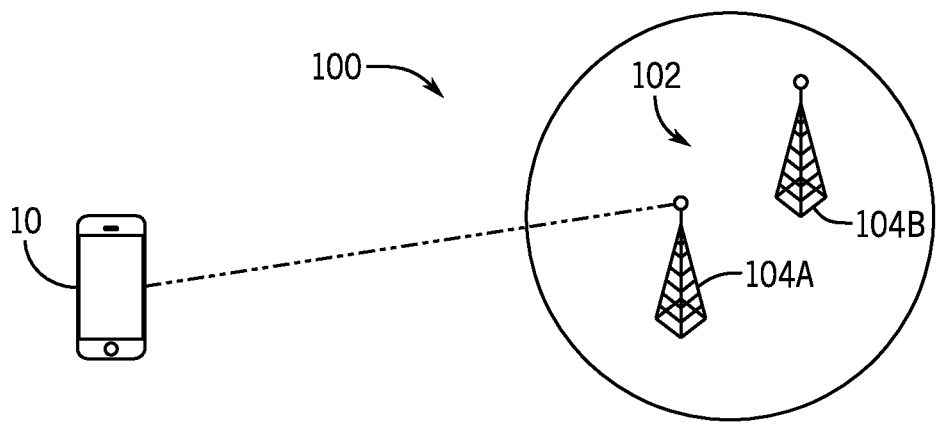
FIG. 3 is a schematic diagram of a communication system including the user equipment of FIG. 1 communicatively coupled to a wireless communication network supported by base stations, according to embodiments of the present disclosure.

FIG. 3 is a schematic diagram of a communication system 100 including the user equipment 10 of FIG. 1 communicatively coupled to a wireless communication network 102 supported by base stations 104A, 104B (collectively 104), according to embodiments of the present disclosure. In particular, the base stations 104 may include Next Generation NodeB (gNodeB or gNB) base stations and may provide 5G/NR coverage via the wireless communication network 102 to the user equipment 10. The base stations 104 may include any suitable electronic device, such as an access point, a communication hub or node, and so on, that facilitates, supports, and/or implements the network 102. In some embodiments, the base stations 104 may include Evolved NodeB (eNodeB) base stations and may provide 4G/LTE coverage via the wireless communication network 102 to the user equipment 10. Each of the base stations 104 may include at least some of the components of the user equipment 10 shown in FIGS. 1 and 2, including one or more processors 12, the memory 14, the storage 16, the transceiver 30, the transmitter 52, and the receiver 54. It should be understood that while the present disclosure may use 5G/NR as an example specification or standard, the embodiments disclosed herein may apply to other suitable specifications or standards (e.g., such as the 4G/LTE specification, a personal area network (PAN), a local area network (LAN), wireless local area network (WLAN) such as Wi-Fi, a metropolitan area network (MAN), a wide area network (WAN), and so on). Moreover, the network 102 may include any suitable number of base stations 104 (e.g., one or more base stations 104, four or more base stations 104, ten or more base stations 104, and so on). Additionally or alternatively, the base stations 104 may include any number of user equipment 10 that communicatively couple to the wireless communication network 102.

Figure 4:
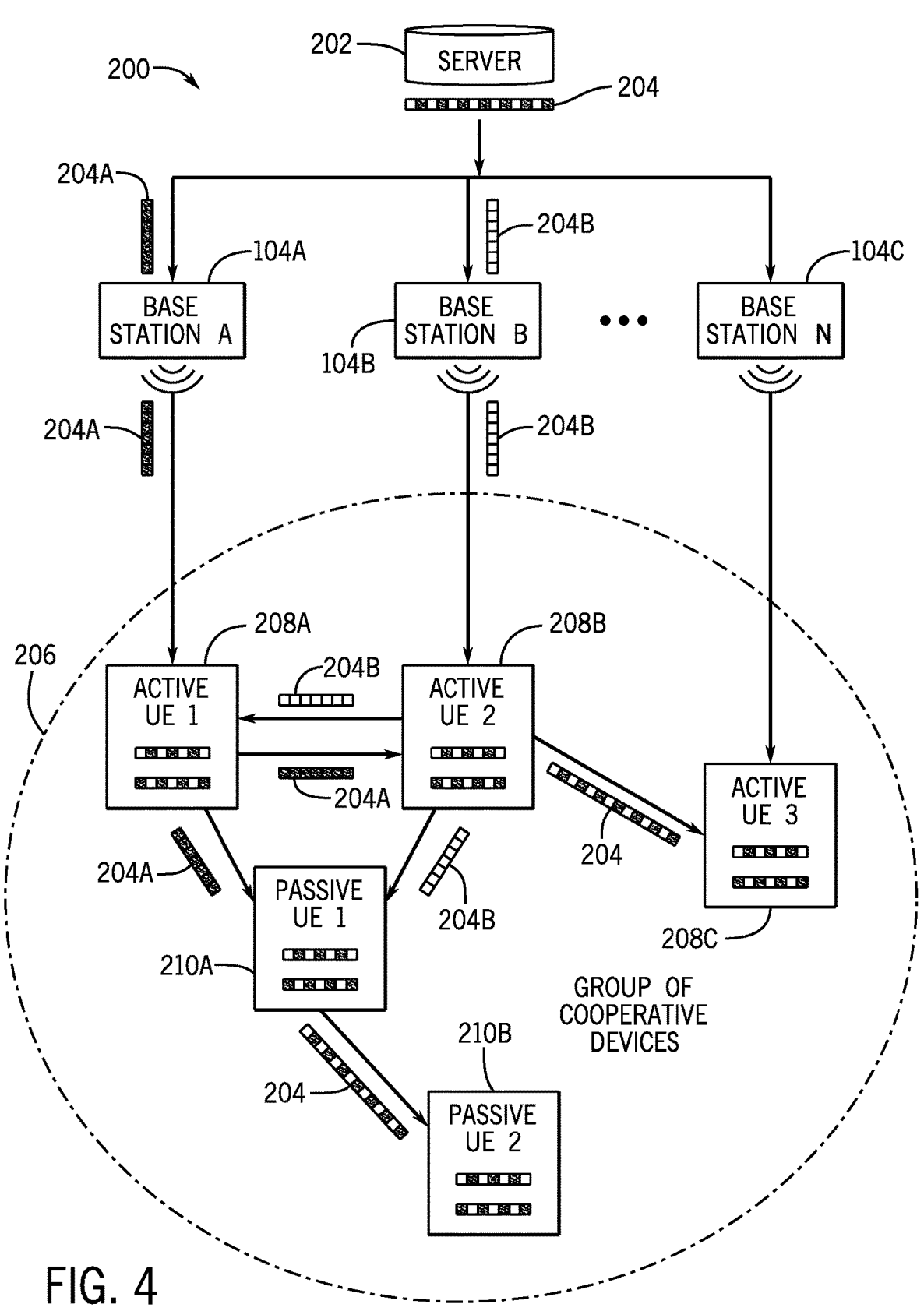
FIG. 4 is a schematic diagram of a communication system including a group of user equipment communicatively coupled to the wireless communication network of FIG. 3, according to embodiments of the present disclosure.

FIG. 4 is a schematic diagram of a communication system 200 including the base stations 104 (e.g., base stations 104A, 104B, 104C), an application server 202, and a group of user equipment 206. The application server 202 may include any suitable electronic device (e.g., a desktop personal computer, a laptop, a mobile electronic device, a tablet, a smartphone, a wearable device, or any other suitable computing device) and may include at least some of the components of the user equipment 10 shown in FIGS. 1 and 2, including one or more processors 12, the memory 14, the storage 16, the transceiver 30, the transmitter 52, and the receiver 54. The communication system 200 may include any suitable number of application servers 202 (e.g., one or more application servers 202, four or more application servers 202, and so on). The base stations 104 may provide access for the group of user equipment 206 to transfer data and/or control information to and from the application server 202. In certain embodiments, a first base station 104A may be associated with a different carrier or operator from a second base station 104B. Additionally or alternatively, one or more of the base stations 104 may operate using the same carrier. The group of user equipment 206 may cooperate for transferring data and/or control information. The group of user equipment 206 may include any number of active user equipment 208A, 208B, 208C (referred to collectively as active user equipment 208) and/or any number of passive user equipment 210A, 210B (referred to collectively as passive user equipment 210). Each user equipment (e.g., active user equipment 208, passive user equipment 210) may include any suitable electronic device and may be an example of the user equipment 10 shown in FIGS. 1 and 2. As such, each of the user equipment may include at least some of the components of the user equipment 10, such as one or more processors 12, the memory 14, the storage 16, the transceiver 30, the transmitter 52, and the receiver 54. Additionally, the group of user equipment 206 may include any suitable number of user equipment (e.g., any suitable number of active user equipment 208, any suitable number of passive user equipment 210).

Each of the active user equipment 208 may be communicatively coupled to the wireless communication network 102 (e.g., via at least one of the base stations 104). Additionally or alternatively, the active user equipment 208 may be communicatively coupled to other active user equipment 208 and/or at least one passive user equipment 210. For example, the active user equipment 208 may be communicatively coupled via any suitable communication technique, such as a device-to-device communication link, sidelink communication, peer-to-peer communication, and so forth. In certain embodiments, the active user equipment 208A may serve as a relay for at least one active user equipment 208 and/or at least one passive user equipment 210. For example, the active user equipment 208A may transfer data and/or control information received from one user equipment (e.g., active user equipment 208B, passive user equipment 210A) in the group 206 to another user equipment (e.g., active user equipment 208C, passive user equipment 210B) in the group 206.

In certain embodiments, any suitable number of active UE 208 may be communicatively coupled with any number of base stations 104. A target UE (e.g., first active UE 208A, first passive UE 210B) may request data from the wireless communication network 102. The group of UE 206 may coordinate and cooperate to transmit the request to the wireless communication network 102. Each active UE 208 may receive the data 204 and/or one or more sets 204A, 204B (e.g., a portion, a subset) of the data from the wireless communication network 102 via base stations 104. The active UEs 208 may transfer the sets of data to other active UEs 208 within the group of user equipment 206. The active UEs 208 may assemble the data based at least in part on the received sets of the data. The group of user equipment 206 may coordinate and cooperate to provide the data to the target UE. Accordingly, the target UE may receive the data and/or the data sets and may assemble the data based on the data sets.

Figure 5:
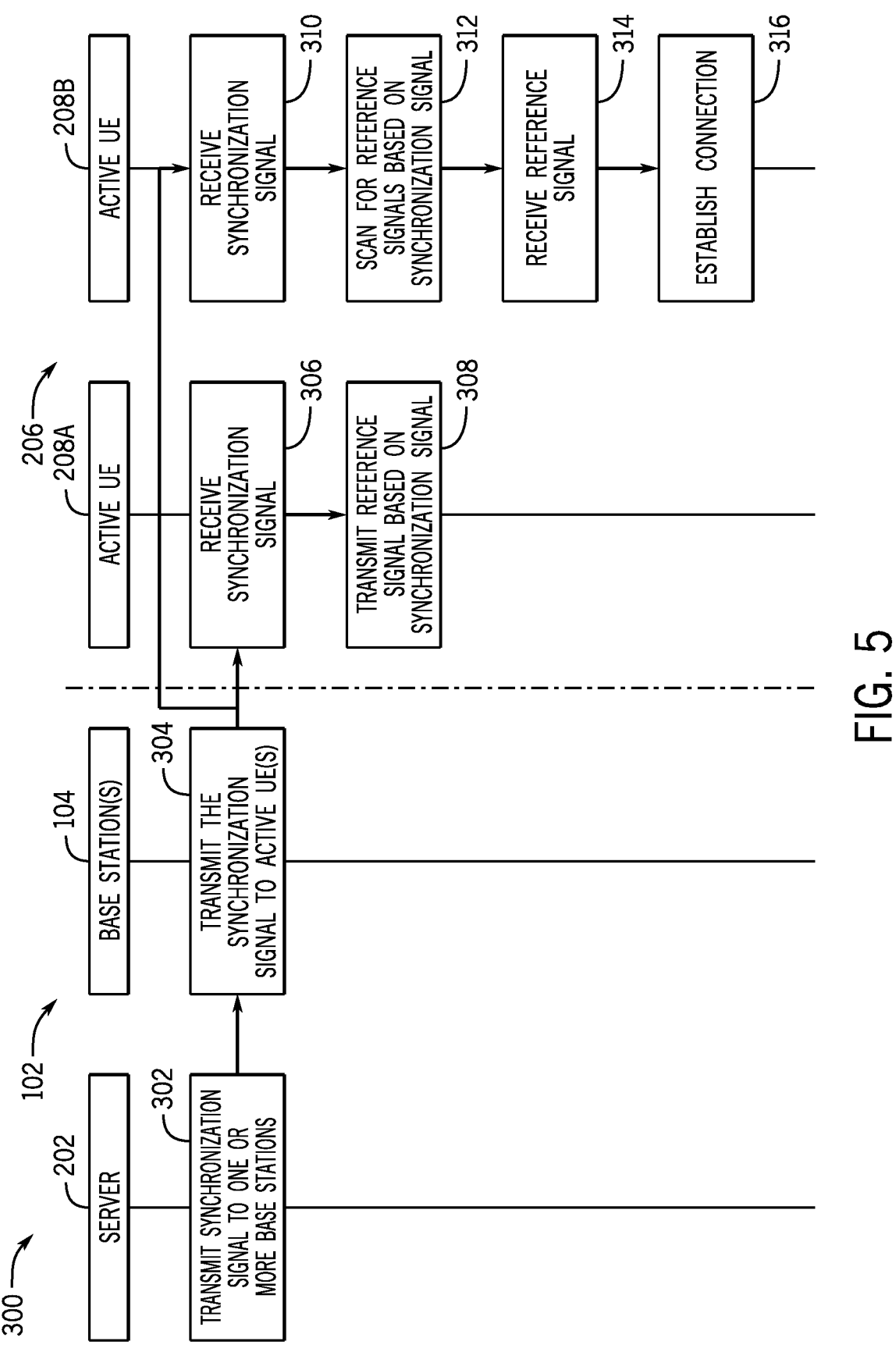
FIG. 5 is a flowchart of a method to synchronize the group of user equipment in FIG. 4 using the wireless communication network, according to embodiments of the present disclosure.

With the foregoing in mind, FIG. 5 is a flowchart of a method 300 to synchronize the group of user equipment 206 of FIG. 4 using the wireless communication network 102, according to embodiments of the present disclosure. Any suitable device (e.g., a controller) that may control components of the network 102, the base stations 104, the application server 202, the group of user equipment (UE) 206, the active UEs 208, and/or the passive UEs 210, such as one or more respective processors 12 of these devices, may perform the method 300. In some embodiments, the method 300 may be implemented by executing instructions stored in a tangible, non-transitory, computer-readable medium, such as the one or more respective memories 14 or storages 16 of these devices, using the processors 12. For example, the method 300 may be performed at least in part by one or more software components, such as one or more respective operating systems of the network 102, the base stations 104, the application server 202, the group of user equipment (UE) 206, the active UEs 208, and/or the passive UEs 210, one or more software applications of the network 102, the base stations 104, the application server 202, the group of user equipment (UE) 206, the active UEs 208, and/or the passive UEs 210 and the like. While the method 300 is described using steps in a specific sequence, it should be understood that the present disclosure contemplates that the described steps may be performed in different sequences than the sequence illustrated, and certain described steps may be skipped or not performed altogether.

In process block 302, the network 102 and/or the application server 202 broadcasts or transmits one or more synchronization signals to the base stations 104. The base stations 104 may receive the one or more synchronization signals and may transmit (block 304) the one or more synchronization signals to active UE 208A and active UE 208B. Alternatively, the base stations 104 may generate the one or more synchronization signals. The first active UE 208A may receive (block 306) the one or more synchronization signals from the base stations 104. The first active UE 208A may transmit (block 308) a reference signal based on the one or more synchronization signals. In certain embodiments, the first active UE 208A may generate and/or may transmit the reference signal in response to receiving the synchronization signal. As such, the synchronization signal may cause the first active UE 208A to transmit the reference signal.

A second active UE 208B may receive (block 310) one or more synchronization signals. After receiving the one or more synchronization signals, the second active UE 208B may scan (block 312) for one or more reference signals based on the one or more synchronization signals. For example, the synchronization signal may cause the second active UE 208B to scan for the reference signal. The second active UE 208B may receive (block 314) the reference signal. The second active UE 208B may measure the reference signal. The second active UE 208B may establish (block 316) a device-to-device communication link with the first active UE 208A based on the reference signal.

Figure 6:
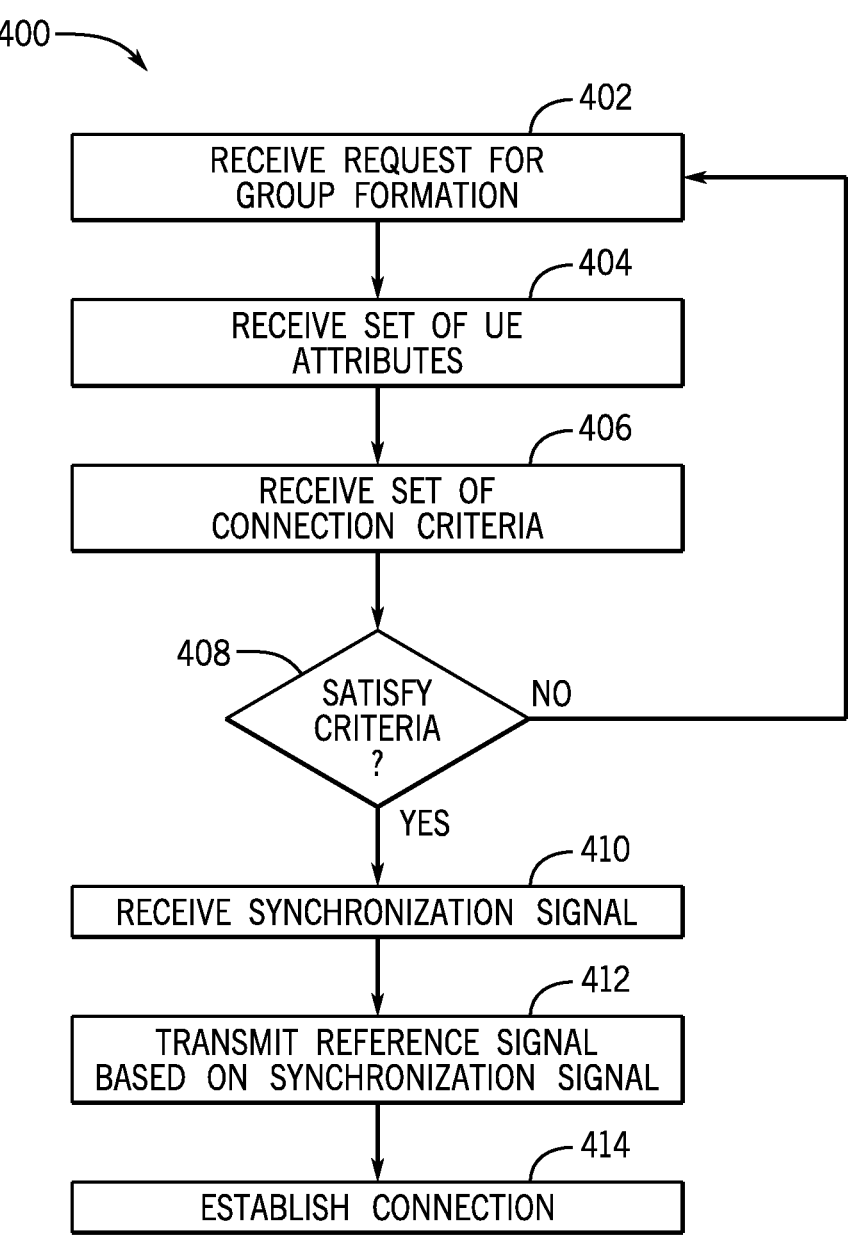
FIG. 6 is a flowchart of a method to synchronize the group of user equipment of FIG. 4 using active user equipment of the group of user equipment, according to embodiments of the present disclosure.

With the foregoing in mind, FIG. 6 is a flowchart of a method 400 to forming the group of user equipment 206 of FIG. 4, according to embodiments of the present disclosure.

Any suitable device (e.g., a controller) that may control components of the network 102, the base stations 104, the application server 202, the group of user equipment (UE) 206, the active UEs 208, and/or the passive UEs 210, such as one or more respective processors 12 of these devices, may perform the method 400. In some embodiments, the method 400 may be implemented by executing instructions stored in a tangible, non-transitory, computer-readable medium, such as the one or more respective memories 14 or storages 16 of these devices, using the processors 12. For example, the method 400 may be performed at least in part by one or more software components, such as one or more respective operating systems of the network 102, the base stations 104, the application server 202, the group of user equipment (UE) 206, the active UEs 208, and/or the passive UEs 210, one or more software applications of the network 102, the base stations 104, the application server 202, the group of user equipment (UE) 206, the active UEs 208, and/or the passive UEs 210 and the like. While the method 400 is described using steps in a specific sequence, it should be understood that the present disclosure contemplates that the described steps may be performed in different sequences than the sequence illustrated, and certain described steps may be skipped or not performed altogether.

In process block 402, the active UE 208 may receive a request for group formation. For example, the active UE 208 may receive an input indicative of the request to form the group of UE 206. The input structures 22 may receive the input and may transmit a signal indicative of the input to the processor 12. The active UE 208 may receive (block 404) a set of UE attributes associated with the active UE 208. The active UE 208 may utilize the set of UE attributes to determine preferred communication frequencies, the types of communication technologies associated with the active UE 208, a current battery status of the active UE 208, a current thermal status of the active UE 208, and so forth. The set of UE attributes may include a power connection, a battery level of the active UE 208, a signal characteristic such as a signal strength (e.g., Received Signal Strength Indicator) or signal quality (e.g., signal to noise ratio (SNR)) associated with the wireless communication network 102, a time window, a geographic area of the active UE 208, and so forth. The active UE 208 may receive (block 406) a set of connection criteria. The set of connection criteria may include any number of thresholds associated with corresponding UE attributes. For example, the network signal quality of the active UE 208 may be compared to a threshold. When below the threshold, there may be a risk that service is interrupted. If another UE 10 or a group of UE 206 are in close proximity, the active UE 208 may attempt to form a group or enter the previously formed group of UE 206. Additionally, the criteria may be selected based on user preferences and/or user equipment history. The active UE 208 may determine whether a stable device-to-device connection is available with one or more user equipment 10 in the group of UE 206 based on the Received Signal Strength Indicator (RSSI) and signal to noise ratio (SNR), or other signal characteristics. User equipment trust may be established based on previously entering the group of user equipment 206.

The active UE 208 may determine (block 408) whether the set of UE attributes satisfy at least one criteria of the set of the connection criteria. If the active UE 208 is connected to an electrical grid (e.g., such that it is not powered via its battery), it may not require the benefits of shared resources within the group of UE 206 and may not join the group of UE 206. Alternatively, when connected to the electrical grid, the active UE 206 may join the group of UE 206 to receive additional tasks. The active UE 208 may be permitted to search for and join the group of UE 206 during a particular time window. Additionally, the active UE 208 may search for and enter the group of UE 206 when within a particular geographic area or in proximity or range of a set of UE 10, such as a home or an office. The active UE 208 may lack radio technology or does not support particular frequencies. As such, the active UE 208 may search for and enter the group of UE 206 with different and/or greater UE attributes. Additionally, the active UE 208 may determine whether the UE attributes permit the active UE 208 to communicate with other user equipment in the group of UE 206. In response to failing to satisfy at least one criteria of the set of connection criteria (NO path of block 408), the active UE 208 may return to receive (block 402) a subsequent request for group formation.

Based on satisfaction of at least one criteria of the set of connection criteria (YES path of block 408), the active UE 208 may receive (block 410) one or more synchronization signals. For example, the active UE 208 may scan for the synchronization signals based on satisfying the at least one criteria. The active UE 208 may receive the synchronization signals via the base stations 104. At block 412, the active UE 208 may transmit a reference signal based on the one or more synchronization signals. The active UE 208 may transmit reference signals on a local communications frequency. The reference signals may include specialized wake-up signals that reduce power consumption. Additionally or alternatively, the reference signals may include a first reference signal that includes a specialized wake-up signal and a second reference signal that includes additional information. The active UE 208 may transmit the second reference signal based on an acknowledgement from another UE 10 of the first reference signal. In certain embodiments, the active UE 208 may select one or more reference signals based on various transmission criteria. For example, the transmission criteria may include a power connection, a battery level of the user equipment, a time window, a geographic area of the user equipment, user equipment capabilities (e.g., communication capabilities, computing and/or processing capabilities, sensing capabilities, and so forth), and so forth. The active UE 208 may establish (block 414) a device-to-device communication link with another UE 10. For example, the active UE 208 may receive an acknowledgment message from the UE 10 based on receiving the reference signals. The active UE 208 may establish the device-to-device communication link in response to receiving the acknowledgment message from the UE 10.

Figure 7:
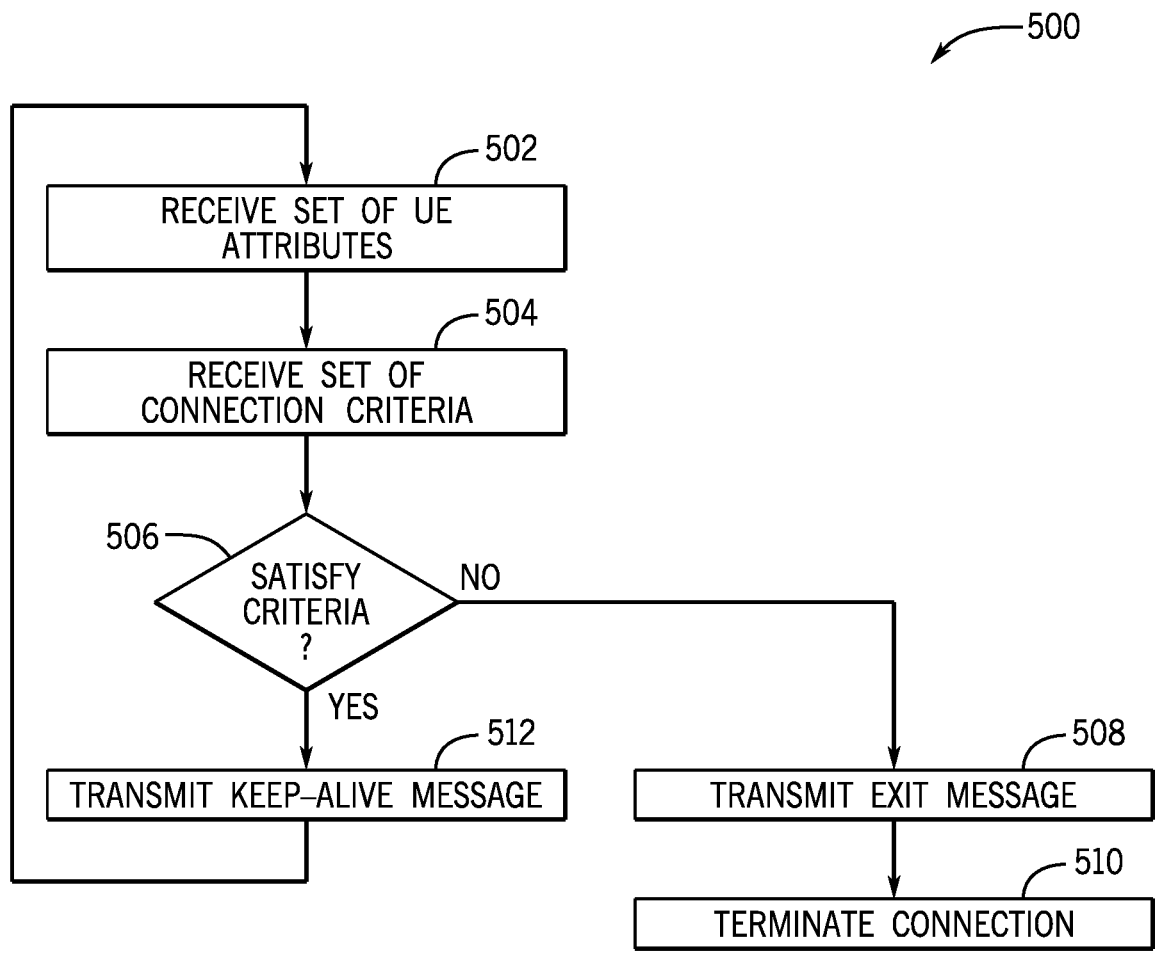
FIG. 7 is a flowchart of a method to adjust membership of the group of user equipment of FIG. 4, according to embodiments of the present disclosure.

With the foregoing in mind, FIG. 7 is a flowchart of a method 500 to adjust membership of the group of user equipment 206 of FIG. 4, according to embodiments of the present disclosure. Any suitable device (e.g., a controller) that may control components of the network 102, the base stations 104, the application server 202, the group of user equipment (UE) 206, the active UEs 208, and/or the passive UEs 210, such as one or more respective processors 12 of these devices, may perform the method 500. In some embodiments, the method 500 may be implemented by executing instructions stored in a tangible, non-transitory, computer-readable medium, such as the one or more respective memories 14 or storages 16 of these devices, using the processors 12. For example, the method 500 may be performed at least in part by one or more software components, such as one or more respective operating systems of the network 102, the base stations 104, the application server 202, the group of user equipment (UE) 206, the active UEs 208, and/or the passive UEs 210, one or more software applications of the network 102, the base stations 104, the application server 202, the group of user equipment (UE) 206, the active UEs 208, and/or the passive UEs 210 and the like. While the method 500 is described using steps in a specific sequence, it should be understood that the present disclosure contemplates that the described steps may be performed in different sequences than the sequence illustrated, and certain described steps may be skipped or not performed altogether.

The UE 10 may receive (block 502) a set of UE attributes associated with the UE 10. The set of UE attributes may include an elapsed time from a previous keep-alive message, an elapsed time from receiving a task from a primary UE, and the like. The UE 10 may also receive (block 504) a set of connection criteria associated with the group of UE 206. In response to failing to satisfy at least one criteria of the set of connection criteria (NO path of block 506), the UE 10 may transmit (block 508) an exit message. The UE 10 may compare the elapsed times to a threshold time duration and may transmit the exit message based on one or more of the elapsed times exceeding the threshold time duration. As such, the UE 10 may terminate (block 510) one or more device-to-device communication links with other UE 10 in the group of UE 206.

Based on satisfaction of at least one criteria of the set of connection criteria (YES path of block 506), the UE 10 may transmit (block 512) a keep-alive message. The UE 10 may periodically send a keep alive message to at least one primary user equipment and/or active user equipment in the group of UE 206. As such, the primary UE may maintain membership of the UE 10 within the group of UE 206. Additionally or alternatively, the primary UE may transmit one or more keep-alive messages to UE 10 within the group of UE 206. The primary UE may maintain membership of the UE 10 that transmit an acknowledgment of the keep-alive message. Additionally, the primary UE may terminate one or more device-to-device communication links if no acknowledgment message is received from one or more UE 10 within the group of UE 206. The primary UE may also transmit an exit message to one or more UE 10.

Figure 8:
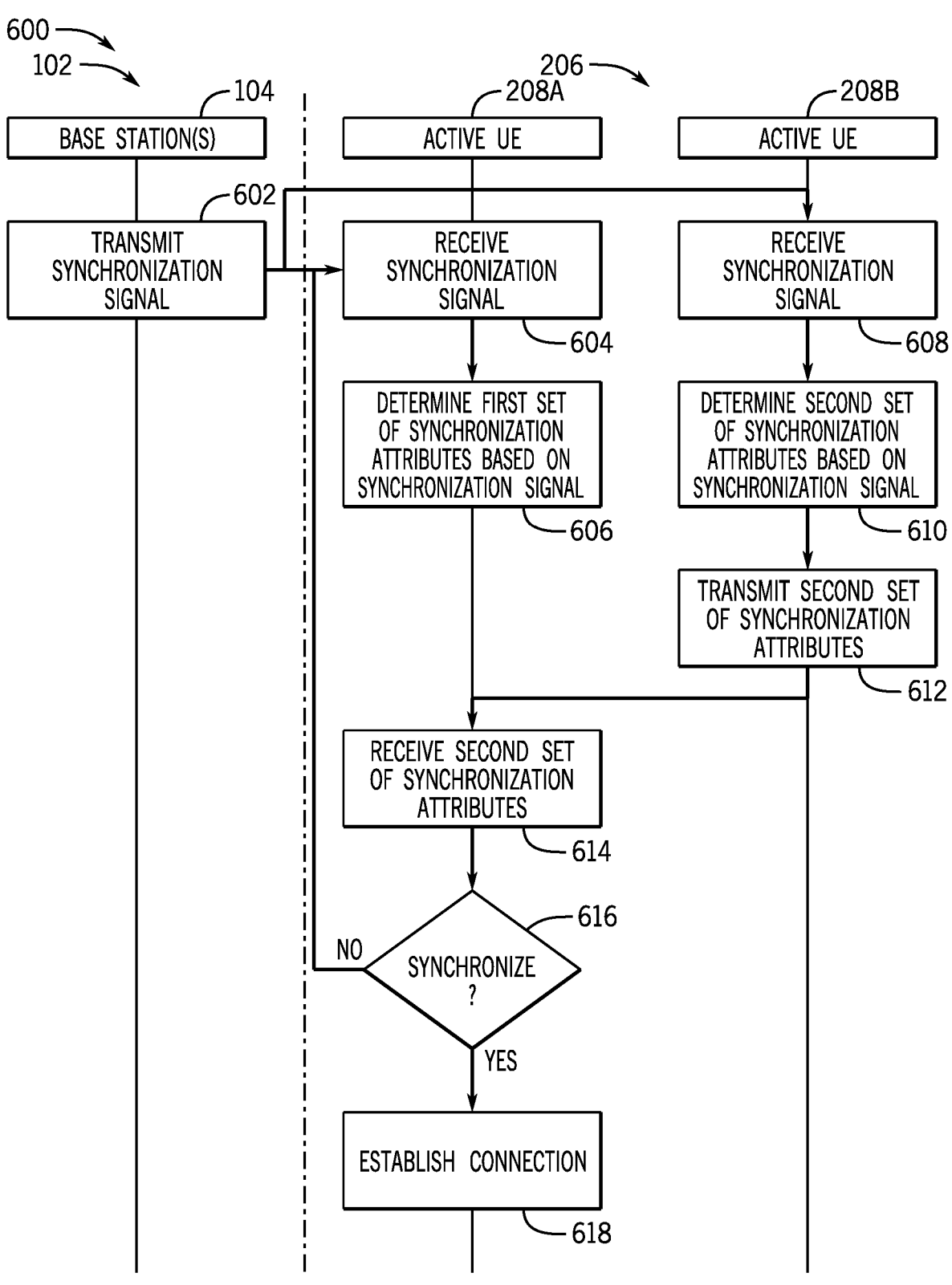
FIG. 8 is a flowchart of a method to share synchronization attributes with the group of user equipment of FIG. 4 to communicate with the wireless communication network of FIG. 3, according to embodiments of the present disclosure.

With the foregoing in mind, FIG. 8 is a flowchart of a method 600 to synchronize the group of user equipment 206 using synchronization signals from the wireless communication network 102, according to embodiments of the present disclosure. Any suitable device (e.g., a controller) that may control components of the network 102, the base stations 104, the application server 202, the group of user equipment (UE) 206, the active UEs 208, and/or the passive UEs 210, such as one or more respective processors 12 of these devices, may perform the method 600. In some embodiments, the method 600 may be implemented by executing instructions stored in a tangible, non-transitory, computer-readable medium, such as the one or more respective memories 14 or storages 16 of these devices, using the processors 12. For example, the method 600 may be performed at least in part by one or more software components, such as one or more respective operating systems of the network 102, the base stations 104, the application server 202, the group of user equipment (UE) 206, the active UEs 208, and/or the passive UEs 210, one or more software applications of the network 102, the base stations 104, the application server 202, the group of user equipment (UE) 206, the active UEs 208, and/or the passive UEs 210 and the like. While the method 600 is described using steps in a specific sequence, it should be understood that the present disclosure contemplates that the described steps may be performed in different sequences than the sequence illustrated, and certain described steps may be skipped or not performed altogether.

One or more base stations may transmit (block 602) one or more synchronization signals to active UEs 208A and 208B. For example, the base stations 104 may generate the synchronization signals. The synchronization signals may include a primary synchronization signal (PSS), a secondary synchronization signal (SSS), and so forth. The synchronization signals may include timing information that assists the user equipment in transmission and/or reception of data via the wireless communication network. The synchronization signals may also include frequency information that reduces phase drift. The synchronization signals may also include phase information that provides coherent (e.g., in-phase) signal transmission to the wireless communication network. At block 604, the first active UE 208A may receive the one or more synchronization signals. The first active UE 208A may also determine (block 606) a first set of synchronization attributes based on the one or more synchronization signals. The synchronization attributes may include a time, a frequency, a phase, a carrier frequency, a bandwidth, a sub-carrier spacing, and so forth based on the one or more synchronization signals, the timing information, the frequency information, and the phase information. At block 608, the second active UE 208B may receive (block 608) the one or more synchronization signals. The second active UE 208B may also determine (block 610) a second set of synchronization attributes based on the one or more synchronization signals.

The second active UE 208B may transmit (block 612) the second set of synchronization attributes to the first active UE 208A. The first active UE 208A may receive (block 614) the second set of synchronization attributes from the second active UE 208B. The first active UE 208A may determine (block 616) whether the first set of synchronization attributes correlates with the second set of synchronization attributes. In certain embodiments, the first active UE 208A may determine one or more of the first set of synchronization attributes are within threshold values of the second set of synchronization attributes. For example, the first active UE 208A may determine a first frequency is within a threshold frequency value of a second frequency. If the first set of synchronization attributes does not correlate with the second set of synchronization attributes (NO path of block 616), the first active UE 208A may return to block 604 to receive one or more additional synchronization signals. If the first set of synchronization attributes does correlate with the second set of synchronization attributes (YES path of block 616), the first active UE 208A may establish a connection with the wireless communication network based on the first set of synchronization attributes, the second set of synchronization attributes, or both.

Figure 9:
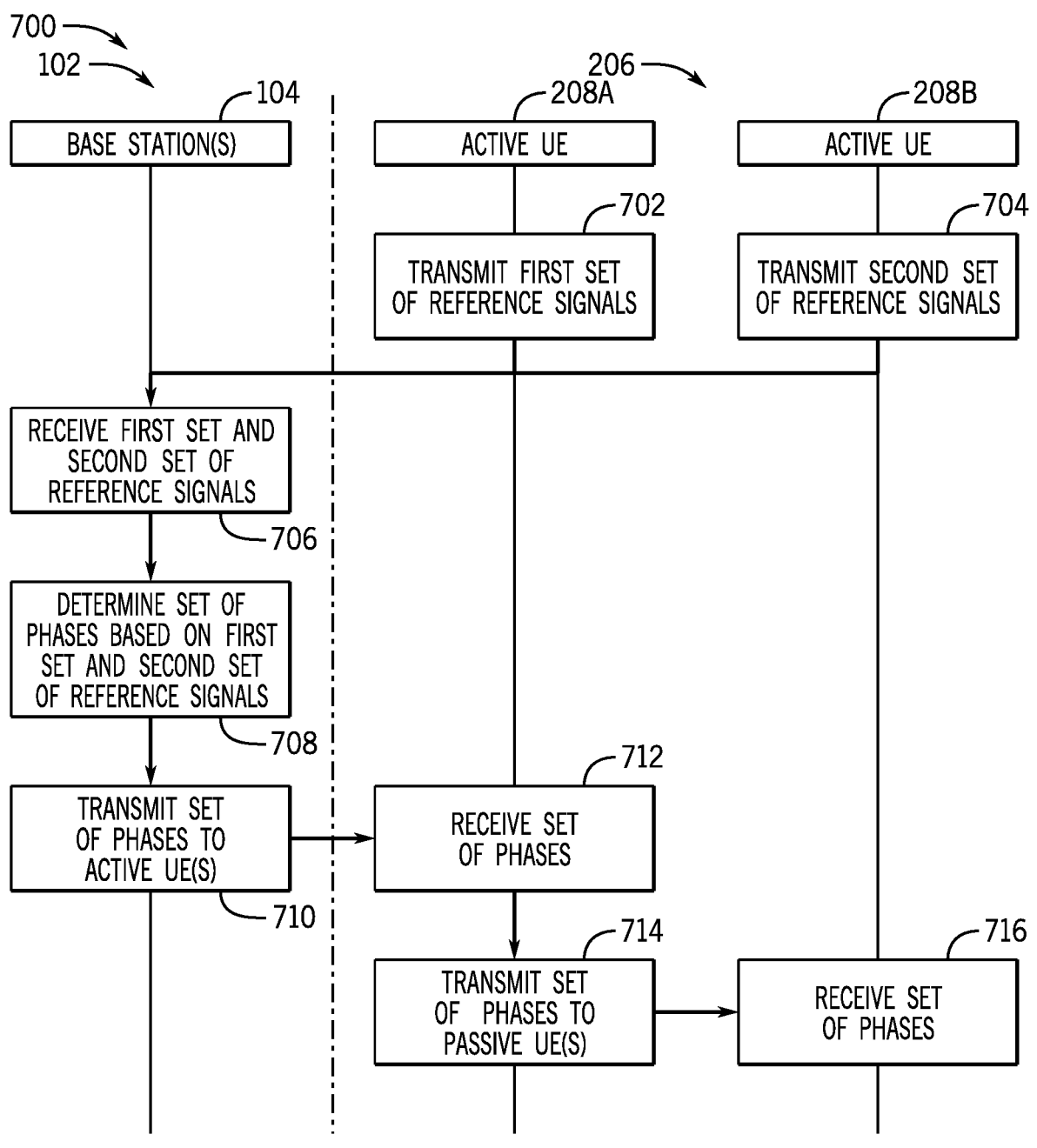
FIG. 9 is a flowchart of a method to share phase synchronization data with user equipment in the group of user equipment of FIG. 4, according to embodiments of the present disclosure.

The active UEs 208 may also receive synchronization signals from a source external from the wireless communication network, such as a global navigation satellite system (GNSS) signal. Alternatively, the primary UE may transmit synchronization signals to UE 10 within the group of UE 206. The UE 10 may receive the synchronization signals and may determine timing synchronization and/or frequency synchronization based on the synchronization signals. The primary user equipment may select a bandwidth associated with the synchronization signals. Additionally, the primary user equipment may select a transmission duration associated with the synchronization signals based on the frequency. The primary user equipment may also select a periodicity associated with the synchronization signals With the foregoing in mind, FIG. 9 is a flowchart of a method 700 for phase synchronization of the group of UE 206, according to embodiments of the present disclosure. Any suitable device (e.g., a controller) that may control components of the network 102, the base stations 104, the application server 202, the group of user equipment (UE) 206, the active UEs 208, and/or the passive UEs 210, such as one or more respective processors 12 of these devices, may perform the method 700. In some embodiments, the method 700 may be implemented by executing instructions stored in a tangible, non-transitory, computer-readable medium, such as the one or more respective memories 14 or storages 16 of these devices, using the processors 12. For example, the method 700 may be performed at least in part by one or more software components, such as one or more respective operating systems of the network 102, the base stations 104, the application server 202, the group of user equipment (UE) 206, the active UEs 208, and/or the passive UEs 210, one or more software applications of the network 102, the base stations 104, the application server 202, the group of user equipment (UE) 206, the active UEs 208, and/or the passive UEs 210 and the like. While the method 700 is described using steps in a specific sequence, it should be understood that the present disclosure contemplates that the described steps may be performed in different sequences than the sequence illustrated, and certain described steps may be skipped or not performed altogether.

At block 702, the first active UE 208A may transmit a first set of reference signals to base stations 104. Each active UE 208 may transmit sounding reference signals to one or more base stations 104 via the wireless communication network 102. The second active UE 208B may transmit (block 704) a second set of reference signals to the base stations 104. The base stations 104 may receive (block 706) a first set of reference signals from active UEs 208 and a second set of reference signals from passive UEs 210. The base stations 104 may determine (block 708) a set of phases based on the first and second sets of reference signals. The base stations 104 may receive the sets of reference signals and may determine phase relationships (e.g., phase differences) between the UE 10 within the group of UE 206. The base stations 104 may transmit (block 710) the set of phases to active UEs 208. The first active UE 208A may receive (block 712) the set of phases. The first active UE 208A may transmit (block 714) the set of phases to the second active UE 208B. The second active UE 208B may receive (block 716) the set of phases. As such, the active UEs 208 may transmit and/or receive data and/or signals using the set of phases. Each active UE 208 may transmit and/or receive data using a corresponding phase of the set of phases.

Figure 10:
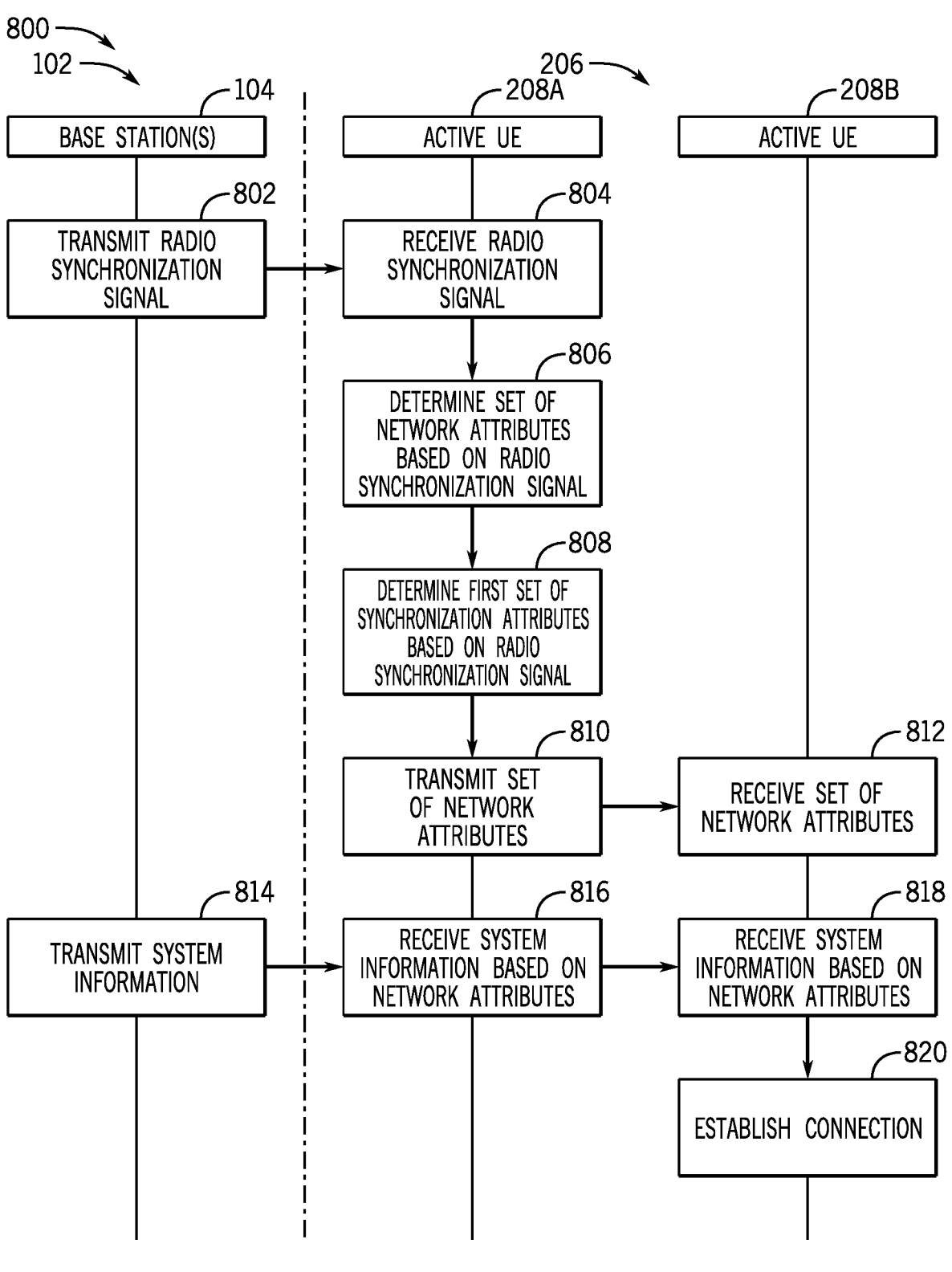
FIG. 10 is a flowchart of a method to receive radio synchronization signals from the wireless communication network of FIG. 3, according to embodiments of the present disclosure.

With the foregoing in mind, FIG. 10 is a flowchart of a method 800 to receive system information associated with the wireless communication network 102, according to embodiments of the present disclosure. Any suitable device (e.g., a controller) that may control components of the network 102, the base stations 104, the application server 202, the group of user equipment (UE) 206, the active UEs 208, and/or the passive UEs 210, such as one or more respective processors 12 of these devices, may perform the method 800. In some embodiments, the method 800 may be implemented by executing instructions stored in a tangible, non-transitory, computer-readable medium, such as the one or more respective memories 14 or storages 16 of these devices, using the processors 12. For example, the method 800 may be performed at least in part by one or more software components, such as one or more respective operating systems of the network 102, the base stations 104, the application server 202, the group of user equipment (UE) 206, the active UEs 208, and/or the passive UEs 210, one or more software applications of the network 102, the base stations 104, the application server 202, the group of user equipment (UE) 206, the active UEs 208, and/or the passive UEs 210 and the like. While the method 800 is described using steps in a specific sequence, it should be understood that the present disclosure contemplates that the described steps may be performed in different sequences than the sequence illustrated, and certain described steps may be skipped or not performed altogether.

At block 802, the base stations 104 may transmit a radio synchronization signal to active UEs 208. The radio synchronization signal may include a primary synchronization signal (PSS), a secondary synchronization signal (SSS), and so forth. The first active UE 208A may receive (block 804) the radio synchronization signal from the base stations 104. The first active UE 208A may determine (block 808) a set of network attributes based on the radio synchronization signal. The set of network attributes may include radio frame boundaries, a frequency, a timing, a cell identifier, and so forth. The first active UE 208A may determine (block 810) a first set of synchronization attributes based on the radio synchronization signal. At block 812, the first active UE 208A may transmit the set of network attributes to the second active UE 208B. At block 816, the base stations 104 may transmit system information to active UEs 208. The first active UE 208A may receive (block 818) system information from base stations 104 based on the set of network attributes. The first active UE 208A may also transmit the system information to the second active UE 208B. The second active UE 208B may receive (block 820) system information based on the set of network attributes and may establish a connection with the wireless communication network 102 based on the system information.

Figure 11:
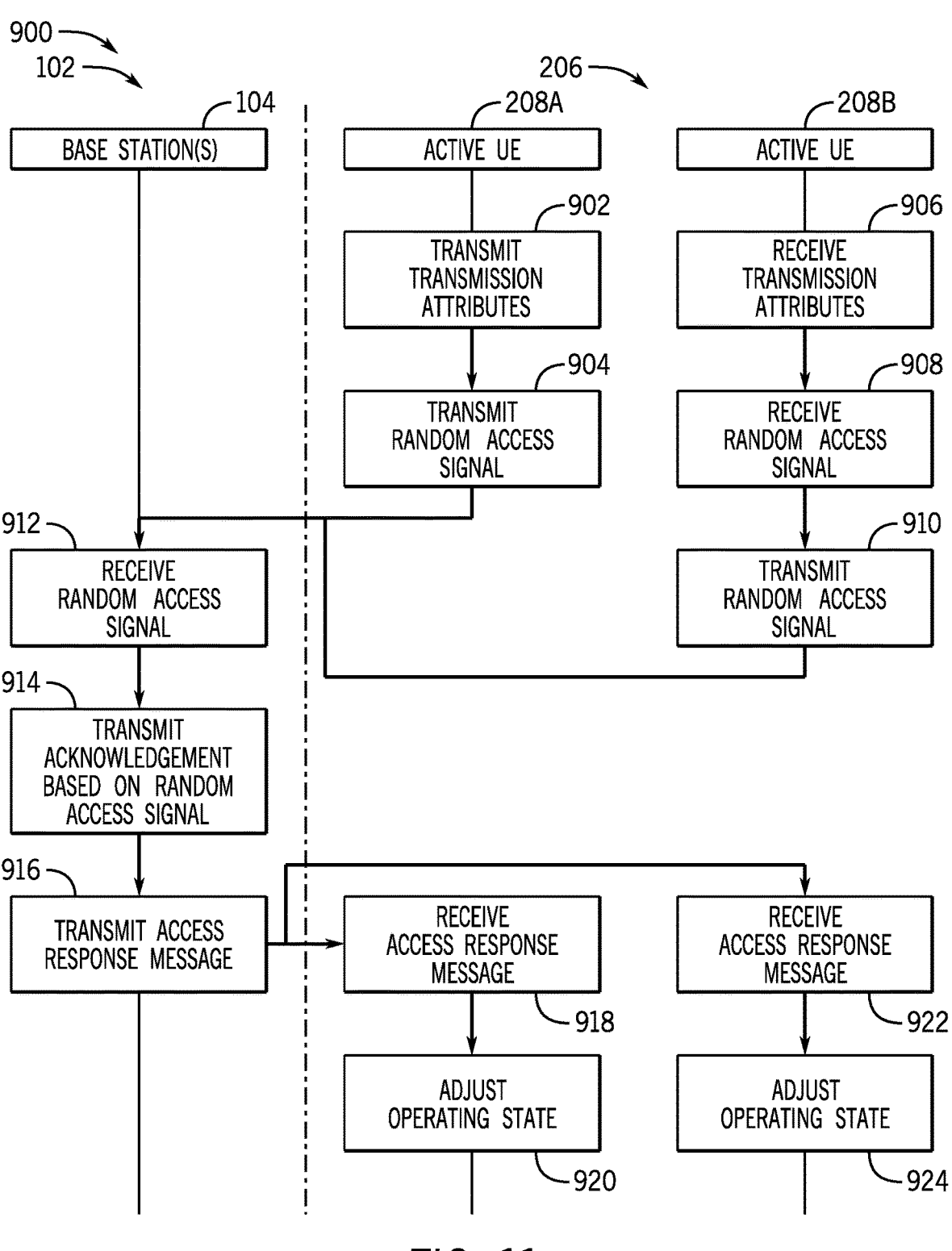
FIG. 11 is a flowchart of a method to receive an access response message from the wireless communication network of FIG. 3, according to embodiments of the present disclosure.

With the foregoing in mind, FIG. 11 is a flowchart of a method 900 to receive system information associated with the wireless communication network 102, according to embodiments of the present disclosure. Any suitable device (e.g., a controller) that may control components of the network 102, the base stations 104, the application server 202, the group of user equipment (UE) 206, the active UEs 208, and/or the passive UEs 210, such as one or more respective processors 12 of these devices, may perform the method 900. In some embodiments, the method 900 may be implemented by executing instructions stored in a tangible, non-transitory, computer-readable medium, such as the one or more respective memories 14 or storages 16 of these devices, using the processors 12. For example, the method 900 may be performed at least in part by one or more software components, such as one or more respective operating systems of the network 102, the base stations 104, the application server 202, the group of user equipment (UE) 206, the active UEs 208, and/or the passive UEs 210, one or more software applications of the network 102, the base stations 104, the application server 202, the group of user equipment (UE) 206, the active UEs 208, and/or the passive UEs 210 and the like. While the method 900 is described using steps in a specific sequence, it should be understood that the present disclosure contemplates that the described steps may be performed in different sequences than the sequence illustrated, and certain described steps may be skipped or not performed altogether.

The first active UE 208A may transmit (block 902) transmission attributes to one or more active UE 208, such as second active UE 208B. The transmission attributes may include a time associated with transmission to the wireless communication network 102, a frequency associated with transmission to the wireless communication network 102, a signature associated with transmission to the wireless communication network 102, a cell identifier, and so forth. The first active UE 208A may transmit (block 904) a random access signal to the base stations 104. Additionally, the first active UE 208A may transmit the random access signal to one or more active UE 208. The second active UE 208B may receive (block 906) transmission attributes. The second active UE 208B may also receive (block 908) the random access signal from the first active UE 208A and may transmit (block 910) the random access signal to the base stations 104. The base stations 104 may receive (block 912) the random access signal from the first active UE 208A and/or the second active UE 208B. At block 914, the base stations 104 may transmit an acknowledgement message based on the one or more random access signals. The base stations 104 may also transmit (block 916) an access response message to first active UE 208A and second active UE 208B. The first active UE 208A may receive (block 918) the access response message from the base stations 104. The first active UE 208A may adjust (block 920) an operating state associated with the first active UE 208A based on the access response message. For example, the first active UE 208A may begin a connected mode. The second active UE 208B may receive (block 920) the access response message from the base stations 104. The second active UE 208A may adjust (block 922) an operating state associated with the second active UE 208A based on the access response message. For example, the second active UE 208A may begin the connected mode.

FIG. 12 is a flowchart of a method 1000 to establish a connection between the group of user equipment 206 and the wireless communication network, according to embodiments of the present disclosure. Any suitable device (e.g., a controller) that may control components of the network 102, the base stations 104, the application server 202, the group of user equipment (UE) 206, the active UEs 208, and/or the passive UEs 210, such as one or more respective processors 12 of these devices, may perform the method 1000. In some embodiments, the method 1000 may be implemented by executing instructions stored in a tangible, non-transitory, computer-readable medium, such as the one or more respective memories 14 or storages 16 of these devices, using the processors 12. For example, the method 1000 may be performed at least in part by one or more software components, such as one or more respective operating systems of the network 102, the base stations 104, the application server 202, the group of user equipment (UE) 206, the active UEs 208, and/or the passive UEs 210, one or more software applications of the network 102, the base stations 104, the application server 202, the group of user equipment (UE) 206, the active UEs 208, and/or the passive UEs 210 and the like. While the method 1000 is described using steps in a specific sequence, it should be understood that the present disclosure contemplates that the described steps may be performed in different sequences than the sequence illustrated, and certain described steps may be skipped or not performed altogether.

The base station may transmit an indication of an access response message on a downlink control channel. At block 1002, the active UE 208 may receive an indication of the access response message via a first downlink channel from the base stations 104. The base stations 104 may transmit the access response message to any number of active UE 208. The access response message may include communication information associated with the wireless communication network 102. The base stations 104 may also transmit information associated with a downlink shared channel. The active UE 208 may receive (block 1004) the control information via the first downlink channel. Any number of active UE 208 may monitor the downlink control channel and may receive the control channel information from the base stations 104 via the downlink control channel. The active UE 208 may transmit (block 1006) the control information to a set of active UEs 208. In certain embodiments, the active UE 208 may transmit the control information to the primary UE. The primary user equipment may aggregate and/or assemble control channel signal for processing and decoding control channel information. The active UE 208 may receive and/or decode the control channel information and may transmit the control channel information to the primary user equipment. The control channel information may include downlink control information that identifies information associated with a transmission (e.g., the acknowledgement message) on the downlink shared channel. The active UE 208 may utilize the information to receive the access response message via the downlink shared channel. The active UE 208 may receive (block 1008) the access response message via a second downlink channel based on the control information. The active UE 208 may receive (block 1010) an acknowledgement based on the access response message. The active UE 208 may receive (block 1012) second control information based on the access response message. The primary user equipment may receive the second control information and may determine communication parameters (e.g., time, frequency, temporary identifier, timing adjustment, and so forth) associated with transmission of an access message. The primary user equipment may transmit the communication parameters to the active UE 208. The active UE 208 may transmit (block 1014) the access message via a second uplink channel based on the second control information. The active UE 208 may receive (block 1016) a transition message. In certain embodiments, the primary user equipment may transmit the transition message to any number of active UE 208. The active UE 208 may adjust (block 1018) an operating state based on the transition message. For example, the active UE 208 may begin the connected mode. The active UE 208 may establish a connection with the wireless communication network 102.

In an embodiment, an electronic device includes a transmitter, a receiver, and a processor coupled to the transmitter and the receiver. The processor receives a synchronization signal via a wireless communication network, transmits a reference signal based on the synchronization signal, receives a message from a first user equipment based on the reference signal, and establishes a device-to-device communication link between the first user equipment and a second user equipment.

The processor also performs a configuration based on the message.

The processor also selects the reference signal from a set of reference signals based on a set of communication factors.

The processor also transmits a wake-up signal to the first user equipment via the device-to-device communication link. The wake-up signal causes the first user equipment to activate a cellular receiver. Each reference signal of the set of reference signals includes a corresponding frequency.

The set of communication factors includes a location factor associated with the second user equipment.

The processor also scans for a second reference signal based on the synchronization signal.

The synchronization signal includes a frame boundary associated with the wireless communication network.

In another embodiment, a method includes receiving, at a first user equipment, a set of user equipment attributes associated with the first user equipment, receiving at the first user equipment, a set of connection criteria associated with a wireless communication network, and establishing a device-to-device communication link with a second user equipment based on the set of user equipment attributes satisfying at least one of the set of connection criteria.

The method also includes broadcasting a reference signal to one or more user equipment based on the set of user equipment attributes satisfying the at least one of the set of connection criteria.

The method also includes receiving, at the first user equipment, a message from the second user equipment based on the reference signal.

The method also includes scanning for a second reference signal based on the set of user equipment attributes satisfying the at least one of the set of connection criteria.

The method also includes receiving the second reference signal from a third user equipment and establishing a second device-to-device communication link with the third user equipment.

The set of connection criteria includes a signal strength threshold associated with the wireless communication network, a battery threshold associated with the first user equipment, a geographic area, a time window, or any combination thereof.

The set of user equipment attributes includes a battery level associated with the first user equipment, a location associated with the first user equipment, a power connection associated with the first user equipment, a signal strength associated with the wireless communication network, or any combination thereof.

In yet another embodiment, one or more non-transitory, tangible, computer-readable media store instructions that cause a processor to receive a message from a first user equipment associated with membership in a group of user equipment, wherein the group of user equipment comprises the first user equipment and a second user equipment, adjust a set of device identifiers associated with the group of user equipment based on the message, and transmit the set of device identifiers to a base station associated with a wireless communication network.

The instructions also cause the processor to determine a signal strength associated with a device-to-device communication link between the second user equipment and a third user equipment, the group of user equipment comprising the third user equipment.

The instructions also cause the processor to transmit an exit message to the third user equipment based on the signal strength failing to satisfy a signal strength threshold.

The instructions also cause the processor to terminate the device-to-device communication link between the second user equipment and the third user equipment based on the signal strength failing to satisfy the signal strength threshold.

The instructions also cause the processor to update the set of device identifiers associated with the group of user equipment based on the signal strength failing to satisfy the signal strength threshold.

The instructions also cause the processor to determine an elapsed time from receiving a previous message associated with a third user equipment, the group of user equipment comprising the third user equipment and terminate the device-to-device communication link between the second user equipment and the third user equipment based on the elapsed time exceeding a threshold time duration.

In an embodiment, an electronic device includes a transmitter, a receiver, and a processor coupled to the transmitter and the receiver. The processor receives a synchronization signal associated with a wireless communication network from a base station, receives a first set of synchronization attributes based on the synchronization signal, and receives a second set of synchronization attributes from a second user equipment, the second user equipment being configured to receive the synchronization signal from the base station. The processor also transmits the first set of synchronization attributes to the second user equipment based on the first set of synchronization attributes correlating with the second set of synchronization attributes.

The processor also causes the second user equipment to establish a connection with the wireless communication network based on the first set of synchronization attributes.

The processor also transmits the first set of synchronization attributes to a third user equipment.

The processor causes the third user equipment to establish a connection with the wireless communication network based on the first set of synchronization attributes.

The processor transmits a first set of reference signals to the base station, the base station receiving a second set of reference signals from the second user equipment.

The processor also receives a set of phases associated with the first set of reference signals or the second set of reference signals from the base station and transmits the set of phases to the second user equipment.

The first set of synchronization attributes comprises a synchronization frequency, a synchronization time, or both.

In another embodiment, a method includes receiving, at a first user equipment, a first portion of system information associated with a wireless communication network from a base station, receiving, at the first user equipment, a second portion of system information associated with the wireless communication network from a second user equipment via a device-to-device communication link, and establishing a connection with the wireless communication network based at least in part on the first portion of system information and the second portion of system information.

The method also includes transmitting the first portion of system information to the second user equipment.

The method also includes causing the second user equipment to establish a connection with the wireless communication network based at least in part of the first portion of system information and the second portion of system information.

The method also includes receiving a frequency associated with the wireless communication network, a cell identifier associated with the wireless communication network, or both based at least in part on the first portion of system information and the second portion of system information.

The method also includes transmitting the first portion of system information and the second portion of system information to a third user equipment via a second device-to-device communication link.

The method also includes causing the third user equipment to establish a connection with the wireless communication network based on the first portion of system information and the second portion of system information.

The method also includes transmitting a set of user equipment attributes associated with the first user equipment to the second user equipment and causing the second user equipment to receive a synchronization signal based on the set of user equipment attributes.

In yet another embodiment, one or more non-transitory, tangible, computer-readable media store instructions that cause a processor to receive a first synchronization signal from a base station via a wireless communication network, receive a second synchronization signal from a second user equipment via a device-to-device communication link, receive a set of system information based on the first synchronization signal and the second synchronization signal, and establish a connection with the wireless communication network based at least in part on the set of system information.

The instructions also cause the processor to transmit the set of system information to the second user equipment and cause the second user equipment to establish a connection with the wireless communication network based on the set of system information.

The instructions also cause the processor to receive a second set of system information associated with the wireless communication network from a third user equipment and establish a second connection with the wireless communication network based on the second set of system information.

The instructions also cause the processor to transmit the second set of system information to a fourth user equipment and cause the fourth user equipment to establish a connection with the wireless communication network based on the second set of system information.

The instructions also cause the processor to receive a set of network attributes associated with the wireless communication network based on the set of system information.

The instructions also cause the processor to establish the connection with the wireless communication network based on the set of network attributes.

In yet another embodiment, an electronic device includes a transmitter, a receiver, and a processor coupled to the transmitter and the receiver. The processor transmits an access signal to a set of user equipment within a group of user equipment, transmits a set of transmission attributes associated with the access signal to the set of user equipment, and causes the set of user equipment to transmit the access signal to a base station of a wireless communication network based on the set of transmission attributes.

The processor also receives an acknowledgment message from the base station via a first channel and receives control information associated with a second channel based on the acknowledgement message.

The processor also receives a response message via the second channel based on the control information.

The processor also transmits the control information to the set of user equipment and causes at least one user equipment of the set of user equipment to receive a response message via the second channel based on the control information.

The processor also receives second control information from the base station based on the response message and transmits an access message to the base station via the second channel.

The processor also transmits the second control information to the set of user equipment and causes the set of user equipment to transmit the access message to the base station based on the second control information.

The processor also causes the base station to transmit a transition message based on the access message and adjusts an operational mode based on the transition message.

In another embodiment, a method includes receiving an access signal from a group of user equipment, transmitting an acknowledgement message to the group of user equipment via a first channel, transmitting a response message to the group of user equipment via a second channel, and causing at least one user equipment of the group of user equipment to receive the response message based on the acknowledgement message.

The acknowledgement message comprises information associated with the second channel.

The method also includes causing the at least one user equipment to transmit an access message based on the response message.

The response message includes a frequency associated with the access message, a time associated with the access message, or both.

The method also includes receiving the access message, transmitting a transition message based on the access message, and causing the at least one user equipment to adjust an operational mode based on the transition message.

The method also includes receiving a set of reference signals from a set of user equipment, each reference signal associated with a corresponding phase, selecting a first reference signal from the set of reference signals based on a signal strength associated with the first reference signal, and transmitting information associated with the first reference signal to the at least one user equipment.

In another embodiment, one or more non-transitory, tangible, computer-readable media store instructions that cause a processor to receive a set of reference signals associated with a group of user equipment, each reference signal associated with a corresponding phase, select a reference signal from the set of reference signals based at least in part on a signal strength associated with the reference signal, transmit information associated with the reference signal to at least one user equipment of the group of user equipment, and cause the at least one user equipment to transmit the information to the group of user equipment.

The instructions also cause the processor to receive an access message from the group of user equipment based on a first phase associated with the reference signal.

The instructions also cause the processor to transmit data to the at least one user equipment of the group of user equipment and cause the at least one user equipment to transmit the data to the group of user equipment.

The instructions also cause the processor to transmit a transition message to the at least one user equipment, the transition message adjusting an operational mode of the at least one user equipment.

The instructions also cause the processor to transmit a configuration message associated with a timing for the group of user equipment to the at least one user equipment and cause the at least one user equipment to transmit one or more messages based on the timing.

The timing includes a delay associated with a device-to-device communication link between the at least one user equipment and a second user equipment of the group of user equipment.

The instructions also cause the processor to retransmit the configuration message to the at least one user equipment based on an elapsed time meeting or exceeding the delay.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use,

The invention claimed is:

1. An electronic device, comprising:
a transmitter;
a receiver; and
a processor coupled to the transmitter and the receiver, the processor configured to:
    cause the transmitter to transmit an access signal to a set of user equipment within a group of user equipment via a device-to-device communication link;
    cause the transmitter to transmit a set of transmission attributes associated with the access signal to the set of user equipment via the device-to-device communication link;
    cause the set of user equipment to transmit the access signal to a base station of a wireless communication network based on the set of transmission attributes;
    cause the receiver to receive an acknowledgment message from the base station via a first channel based on the access signal; and
    cause the receiver to receive control information associated with a second channel based on the acknowledgment message.

2. The electronic device of claim 1, wherein the processor is configured to receive a response message via the second channel based on the control information.

3. The electronic device of claim 1, wherein the processor is configured to:
    transmit the control information to the set of user equipment; and
    cause at least one user equipment of the set of user equipment to receive a response message via the second channel based on the control information.

4. The electronic device of claim 3, wherein the processor is configured to:
    receive second control information from the base station based on the response message; and
    transmit an access message to the base station via the second channel.

5. The electronic device of claim 4, wherein the processor is configured to:
    transmit the second control information to the set of user equipment; and
    cause the set of user equipment to transmit the access message to the base station based on the second control information.

6. The electronic device of claim 4, wherein the processor is configured to:
    cause the base station to transmit a transition message based on the access message; and
    adjust an operational mode based on the transition message.

7. A method, comprising:
receiving, at a receiver of a base station, an access signal from a group of user equipment;
transmitting, by a transmitter of the base station, an acknowledgement message to the group of user equipment via a first channel; and
transmitting, by the transmitter of the base station, a response message to the group of user equipment via a second channel, wherein at least one user equipment of the group of user equipment is configured to receive the response message based on the acknowledgement message.

8. The method of claim 7, wherein the acknowledgement message comprises information associated with the second channel.

9. The method of claim 7, wherein the at least one user equipment is configured to transmit an access message based on the response message.

10. The method of claim 9, wherein the response message comprises a frequency associated with the access message, a time associated with the access message, or both.

11. The method of claim 9, comprising:
receiving, by the receiver of the base station, the access message; and
transmitting, by the transmitter of the base station, a transition message based on the access message, wherein
the at least one user equipment is configured to adjust an operational mode based on the transition message.

12. The method of claim 7, comprising:
receiving, by the receiver of the base station, a set of reference signals from a set of user equipment, each reference signal associated with a corresponding phase;
selecting, by processing circuitry of the base station, a first reference signal from the set of reference signals based on a signal strength associated with the first reference signal; and
transmitting, by the transmitter of the base station, information associated with the first reference signal to the at least one user equipment.

13. One or more non-transitory, tangible, computer-readable media that store instructions configured to cause a processor to:
receive a first set of reference signals from a first user equipment of a group of user equipment;
receive a second set of reference signals from second user equipment of the group of user equipment;
determine a set of phases based on the first set of reference signals and the second set of reference signals; and
transmit information indicating the set of phases to the first user equipment of the group of user equipment, wherein the first user equipment is configured to transmit data based on the set of phases.

14. The one or more non-transitory, tangible, computer-readable media of claim 13, wherein the instructions are configured to cause the processor to determine a first phase of the set of phases based on the first set of reference signals, and the first user equipment is configured to transmit data based on the first phase.

15. The one or more non-transitory, tangible, computer-readable media of claim 13, wherein the first user equipment is configured to transmit the information indicating the set of phases to the second user equipment.

16. The one or more non-transitory, tangible, computer-readable media of claim 13, wherein the instructions are configured to cause the processor to transmit a transition message to the first user equipment or the second user equipment, the transition message being configured to adjust an operational mode of the first user equipment or the second user equipment.

17. The one or more non-transitory, tangible, computer-readable media of claim 13, wherein the instructions are configured to cause the processor to transmit a configuration message associated with a timing for the group of user equipment to the first user equipment or the second user equipment, wherein the first user equipment or the second user equipment is configured to transmit one or more messages based on the timing.

18. The one or more non-transitory, tangible, computer-readable media of claim 17, wherein the timing comprises a delay associated with a device-to-device communication link between the first user equipment and the second user equipment of the group of user equipment.

19. The one or more non-transitory, tangible, computer-readable media of claim 18, wherein the instructions are configured to cause the processor to retransmit the configuration message to the first user equipment or the second user equipment based on an elapsed time meeting or exceeding the delay.

20. The electronic device of claim 1, wherein the control information comprises downlink control information associated with the acknowledgement message.

\* \* \* \* \*